United States Patent
Berggren et al.

(10) Patent No.: US 11,082,981 B2
(45) Date of Patent: Aug. 3, 2021

(54) HARQ FEEDBACK USING CARRIER AGGREGATION

(71) Applicant: HUAWEI TECHNOLOGIES CO., LTD., Guangdong (CN)

(72) Inventors: Fredrik Berggren, Kista (SE); Yan Cheng, Beijing (CN); Lixia Xue, Beijing (CN); David Jean-marie Mazzarese, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/821,988

(22) Filed: Mar. 17, 2020

(65) Prior Publication Data
US 2020/0221460 A1    Jul. 9, 2020

Related U.S. Application Data

(63) Continuation of application No. 16/051,513, filed on Aug. 1, 2018, now Pat. No. 10,602,517, which is a
(Continued)

(51) Int. Cl.
*H04W 72/04*   (2009.01)
*H04L 5/14*    (2006.01)
(Continued)

(52) U.S. Cl.
CPC ....... *H04W 72/0453* (2013.01); *H04L 1/1854* (2013.01); *H04L 1/1861* (2013.01);
(Continued)

(58) Field of Classification Search
CPC ....... H04L 1/06; H04L 1/1692; H04L 1/1812; H04L 1/1861; H04L 1/1893; H04L 5/001;
(Continued)

(56) References Cited

U.S. PATENT DOCUMENTS

2011/0090825 A1   4/2011   Papasakellariou et al.
2012/0032968 A1   2/2012   Fan et al.
(Continued)

FOREIGN PATENT DOCUMENTS

CN   102413505 A   4/2012
CN   102577215 A   7/2012
(Continued)

OTHER PUBLICATIONS

R1-074372 Ericsson,"E-mail summary taking you forward on uplink control signaling",TSG-RAN WG1 #50bis, Shanghai, China, Oct. 8 12, 2007, total 5 pages.
(Continued)

*Primary Examiner* — Marsha D Banks Harold
*Assistant Examiner* — Dharmesh J Patel
(74) *Attorney, Agent, or Firm* — Leydig, Voit & Mayer, Ltd.

(57) ABSTRACT

Embodiments provide methods and devices for data transmission and assignment of uplink control channel resources in an uplink FDD carrier, for enabling a terminal device to provide HARQ feedback for data transmitted in the downlink using carrier aggregation of a downlink FDD carrier and at least one TDD carrier. A method includes associating each downlink subframe in the downlink FDD carrier with an uplink control channel subframe in the uplink FDD carrier, associating each downlink subframe and special subframe in the TDD carrier with an uplink control channel subframe in the uplink FDD carrier, assigning uplink control channel resources in the uplink FDD carrier to the terminal device according to the associations, and transmitting data on said downlink FDD carrier and/or TDD carrier, to be received by the terminal device.

16 Claims, 8 Drawing Sheets

Related U.S. Application Data continuation of application No. 15/079,762, filed on Mar. 24, 2016, now Pat. No. 10,075,956, which is a continuation of application No. PCT/EP2013/070288, filed on Sep. 27, 2013.

(51) Int. Cl.
  *H04L 1/18* (2006.01)
  *H04L 5/00* (2006.01)
(52) U.S. Cl.
  CPC ............ *H04L 5/001* (2013.01); *H04L 5/0055* (2013.01); *H04L 5/14* (2013.01); *H04L 5/1469* (2013.01)
(58) Field of Classification Search
  CPC ....... H04L 5/0005; H04L 5/14; H04L 5/0023; H04L 5/0053; H04L 5/0055; H04L 5/0057; H04L 5/0058; H04L 5/0078; H04L 5/0091; H04L 5/1469; H04L 25/22; H04W 16/32; H04W 72/14; H04W 72/042; H04W 72/0413; H04W 72/0453; H04W 72/1284; H04W 72/1294; H04W 88/02
  See application file for complete search history.

(56) References Cited

U.S. PATENT DOCUMENTS

| | | | |
|---|---|---|---|
| 2012/0039276 A1* | 2/2012 | Li | H04L 1/0029 370/329 |
| 2012/0134305 A1 | 5/2012 | Damnjanovic et al. | |
| 2012/0257552 A1 | 10/2012 | Chen et al. | |
| 2012/0329688 A1 | 12/2012 | Najman | |
| 2013/0016355 A1 | 1/2013 | Landry et al. | |
| 2013/0028149 A1 | 1/2013 | Chen et al. | |
| 2013/0034323 A1 | 2/2013 | Costache et al. | |
| 2013/0114474 A1* | 5/2013 | Fu | H04L 1/1635 370/280 |
| 2013/0163553 A1* | 6/2013 | Lee | H04L 5/0091 370/329 |
| 2013/0329688 A1* | 12/2013 | Yang | H04W 74/0833 370/329 |
| 2013/0343239 A1* | 12/2013 | Damnjanovic | H04W 72/1289 370/280 |
| 2014/0153449 A1 | 6/2014 | Seo et al. | |
| 2014/0334395 A1 | 11/2014 | Lee et al. | |
| 2015/0059363 A1 | 3/2015 | Burd et al. | |
| 2016/0374061 A1 | 12/2016 | Li et al. | |
| 2016/0380741 A1 | 12/2016 | Papasakellariou et al. | |

FOREIGN PATENT DOCUMENTS

| | | |
|---|---|---|
| CN | 102651680 A | 8/2012 |
| CN | 103155465 A | 6/2013 |
| CN | 103229446 A | 7/2013 |
| JP | 2013199189 A | 10/2013 |
| JP | 2013199480 A | 10/2013 |
| JP | 2013199481 A | 10/2013 |
| JP | 2013200353 A | 10/2013 |
| JP | 2015065605 A | 4/2015 |
| JP | 2015065621 A | 4/2015 |
| JP | 2015065622 A | 4/2015 |
| JP | 2015070316 A | 4/2015 |
| JP | 2016537145 A | 12/2016 |
| RU | 2473174 C2 | 1/2013 |
| WO | 2010019088 A1 | 2/2010 |
| WO | 2011147336 A1 | 12/2011 |
| WO | 2012124980 A2 | 9/2012 |
| WO | 2012161510 A2 | 11/2012 |
| WO | 2013016525 A2 | 1/2013 |
| WO | 2013016638 A1 | 1/2013 |
| WO | 2013048114 A2 | 4/2013 |
| WO | 2013066387 A1 | 5/2013 |

OTHER PUBLICATIONS

3GPP TS 36.211 V11.4.0, 3rd Generation Partnership Project; Technical Specification Group Radio Access Network; Evolved Universal Terrestrial Radio Access (E-UTRA); Physical channels and modulation(Release 11), Sep. 2013. total 50 pages.
3GPP TS 36321 V11.3.0, 3rd Generation Partnership Project; Technical Specification Group Radio Access Network; Evolved Universal Terrestrial Radio Access (E-UTRA); Medium Access Control (MAC) protocol specification(Release 11), Jun. 2013. total 57 pages.
3GPP TS 36.213 V11.4.0, 3rd Generation Partnership Project; Technical Specification Group Radio Access Network; Evolved Universal Terrestrial Radio Access (E-UTRA); Physical layer procedures(Release 11), Sep. 2013. total 182 pages.
Qualcomm Incorporated: "A/N+SR with PUCCH format 1b with channel selection", 3GPP TSG RAN WG1 #63, R1-106343. Nov. 2010. total 2 pages.
KDDI: "Scheduling Request Channel in E-UTRA Uplink" 3GPP TSG-RAN WG1#51b R1-080226, Jan. 2008. total 3 pages.
Ericsson: "On multiple ACK/NAK multiplexing on PUCCH for LTE TDD", 3GPP TSG-RAN WG1#54, R1-083256, 4ugust 2008. total 6 pages.
Texas Instruments: "Remaining CSI-RS signaling aspects in Rel-10" 3GPP TSG-RAN WG1#63, R1-105894, Nov. 2010. total 8 pages.
Samsung: "Solutions for FDD-TDD Joint Operation" 3GPP TSG-RAN WG1 74, R1-133102, Aug. 2013. total 3 pages.
ETRI:"Discussion on FDD-TDD joint operation solutions" 3GPP TSG-RAN WG1 74, R1-133184, Aug. 2013. total 3 pages.
Yong Li et al. Control Channel Design for Carrier Aggregation between LTE FDD and LTE TDD Systems, 2012 IEEE. Total 5 pages. XP032202278.
CATT: "DL throughput comparison of ACK/NAK transmission in LTE-A TDD", 3GPP TSG RAN WG1 Meeting #62, R1-104315, Madrid, Spain, Aug 23 27, 2010. Total 4 pages. XP050449673.
EP/20189957.2, Search Report, dated May 7, 2021.
U.S. Appl. No. 16/051,513, filed Aug. 1, 2018.
U.S. Appl. No. 15/079,762, filed Mar. 24, 2016.

\* cited by examiner

HARQ FEEDBACK USING CARRIER AGGREGATION

CROSS REFERENCE TO RELATED APPLICATIONS

This application is a continuation of U.S. patent application Ser. No. 16/051,513, filed on Aug. 1, 2018, which is a continuation of U.S. patent application Ser. No. 15/079,762, filed on Mar. 24, 2016, now U.S. Pat. No. 10,075,956. U.S. patent application Ser. No. 15/079,762 is a continuation of International Application No. PCT/EP2013/070288, filed on Sep. 27, 2013. All of the afore-mentioned patent applications are hereby incorporated by reference in their entireties.

TECHNICAL FIELD

Implementations described herein generally relate to a radio network node, a method in a radio network node, a recipient and a method in a recipient. In particular is herein described a mechanism for enabling hybrid automatic repeat request (HARQ) feedback for data provided by aggregation of a frequency-division duplexing (FDD) carrier and at least one time-division duplexing (TDD) carrier.

BACKGROUND

A user equipment (UE) device, also known as a recipient, a mobile station, wireless terminal and/or mobile terminal is enabled to communicate wirelessly in a wireless communication system, sometimes also referred to as a cellular radio system or a wireless communication network. The communication may be made, e.g., between UEs, between a UE and a wire connected telephone and/or between a UE and a server via a radio access network (RAN) and possibly one or more core networks. The wireless communication may comprise various communication services such as voice, messaging, packet data, video, broadcast, etc.

The UE/recipient may further be referred to as mobile telephone, cellular telephone, computer tablet or laptop with wireless capability, etc. The UE in the present context may be, for example, portable, pocket-storable, hand-held, computer-comprised, or vehicle-mounted mobile devices, enabled to communicate voice and/or data, via the radio access network, with another entity, such as another UE or a server.

The wireless communication system covers a geographical area which is divided into cell areas, with each cell area being served by a radio network node, or base station, e.g., a radio base station (RBS) or base transceiver station (BTS), which in some networks may be referred to as "eNB", "eNodeB", "NodeB" or "B node", depending on the technology and/or terminology used.

Sometimes, the expression "cell" may be used for denoting the radio network node itself. However, the cell may also in normal terminology be used for the geographical area where radio coverage is provided by the radio network node at a base station site. One radio network node, situated on the base station site, may serve one or several cells. The radio network nodes may communicate over the air interface operating on radio frequencies with any UE within range of the respective radio network node.

In some radio access networks, several radio network nodes may be connected, e.g., by landlines or microwave, to a radio network controller (RNC), e.g., in Universal Mobile Telecommunications System (UMTS). The RNC, also sometimes termed base station controller (BSC), e.g., in GSM, may supervise and coordinate various activities of the plural radio network nodes connected thereto. GSM is an abbreviation for Global System for Mobile Communications (originally: Groupe Special Mobile).

In 3rd Generation Partnership Project (3GPP) Long Term Evolution (LTE)/LTE-Advanced, radio network nodes, which may be referred to as eNodeBs or eNBs, may be connected to a gateway, e.g., a radio access gateway, to one or more core networks.

In the present context, the expressions downlink (DL), downstream link or forward link may be used for the transmission path from the radio network node to the UE. The expression uplink (UL), upstream link or reverse link may be used for the transmission path in the opposite direction, i.e., from the UE to the radio network node.

Furthermore, in order to divide forward and reverse communication channels on the same physical communications medium, when communicating in the wireless communication system, a duplexing method may be applied such as, e.g., frequency-division duplexing (FDD) and/or time-division duplexing (TDD). The FDD approach is used over well separated frequency bands in order to avoid interference between uplink and downlink transmissions. In TDD, uplink and downlink traffic are transmitted in the same frequency band, but in different time intervals. The uplink and downlink traffic is thus transmitted separated from each other, in the time dimension in a TDD transmission, possibly with a Guard Period (GP) in between uplink and downlink transmissions. In order to avoid interference between uplink and downlink, for radio network nodes and/or UEs in the same area, uplink and downlink transmissions between radio network nodes and UEs in different cells may be aligned by means of synchronization to a common time reference and use of the same allocation of resources to uplink and downlink.

The prior art LTE-Advanced system supports carrier aggregation, where the communication between the radio network node (eNodeB) and the UE is facilitated by means of concurrent usage of multiple component carriers in the downlink and/or the uplink. Component carriers may be located contiguously or discontiguously in frequency within a frequency band or may even be located in different frequency bands. Hence, carrier aggregation improves the spectrum utilization for the network operator and allows higher data rates to be provided. Although carrier aggregation is defined both for FDD and TDD, UEs in the prior art system do not operate on FDD and TDD carriers simultaneously, hence there is no carrier aggregation utilizing carriers with different duplexing methods. Since network operators may be in possession of both FDD and TDD carriers, it is however desirable to extend the principle to carrier aggregation of FDD and TDD carriers.

Contemporary wireless systems, such as the 3GPP LTE, utilize packet based transmissions. Upon reception of a data packet, the UE transmits Hybrid Automatic Repeat Request (HARQ) messages to the radio network node. These messages may for example comprise an acknowledgement (ACK) or a negative ACK (NACK). New packet transmission or packet retransmissions may subsequently be initialized by the transmitting part once the HARQ feedback is obtained. HARQ feedback signalling will require uplink transmission resources and it is essential to minimize the amount of time-frequency resources to be allocated for HARQ feedback since unused uplink resources may be utilized e.g. for transmitting user data instead. A further problem is to assign a set of uplink resources assuring that there are no uplink resource conflicts, i.e., each recipient/UE must be assigned a set of unique uplink resources for HARQ.

HARQ feedback is sent in the UL in response to a Physical Downlink Shared Channel (PDSCH) scheduled by a Physical Downlink Control Channel (PDCCH)/Enhanced-PDCCH (EPDCCH), a semi-persistently scheduled (SPS) PDSCH or a PDCCH/EPDCCH indicating SPS release. Three feedback states may be used; ACK, NACK and Discontinuous Transmission (DTX). Sometimes NACK may be merged with DTX to a joint state NACK/DTX. In that case, the radio network node cannot discriminate between the NACK and DTX and would, if there was a scheduled PDSCH, need to perform a retransmission. This also precludes using incremental redundancy for the retransmission. DTX refers to discontinuous transmission, which happens if the UE did not receive any PDSCH, e.g., if it missed receiving a transmitted PDCCH/EPDCCH, or if there was no transmitted PDCCH/EPDCCH or PDSCH.

Thus, when applying FDD, the same numbers of uplink and downlink subframes are available during a radio frame, why HARQ feedback may be provided in an uplink subframe for each received downlink subframe and vice versa. In other words, every downlink subframe can be associated to a specific later uplink subframe for feedback generation in way that this association is one-to-one, i.e., to each uplink subframe is associated exactly one downlink subframe. However, in TDD the number of uplink and downlink subframes may be different in some configurations, for example comprising more downlinks subframes than uplink subframes, as illustrated in FIG. 1A.

Generally, one HARQ message is associated with each downlink subframe in TDD, since a data packet (e.g., transport block in LTE) is transmitted in one subframe. This implies that HARQ messages from multiple downlink subframes may need to be transmitted in a single uplink subframe, which requires allocation of multiple unique uplink resources for HARQ. In such scenario, comprising, e.g., four downlink subframes for each uplink subframe, the receiver has to provide HARQ feedback for all the four downlink subframes in one single uplink subframe, as illustrated in FIG. 1B. When doing so, the HARQ feedback may occupy a significant amount of the uplink communication resources. Hence, in particular for TDD, where an uplink subframe may comprise HARQ messages for many users and from multiple subframes, it is essential that the network nodes can make an efficient uplink resource assignment. This becomes particularly important when there are fewer uplink subframes than downlink subframes in a radio frame, since the amount of reserved uplink control channel resources impacts the available resources for data transmission.

In some access technologies such as, e.g., LTE-Advanced, carrier aggregation may be performed by receiving/transmitting on a set of serving cells, wherein a serving cell comprises at least a DL component carrier and possibly an UL component carrier. Here, the notion of cell may not refer to a geometrical area, rather it is should be regarded as logical concept. A UE is always configured with a primary serving cell (PCell) and additionally also with secondary serving cells (SCells). The Physical Uplink Control Channel (PUCCH) is always transmitted on the PCell.

Concerning carrier aggregation, one major issue concerns the uplink feedback. For downlink carrier aggregation, the UE will provide HARQ feedback in the PUCCH transmitted on the primary cell, including ACK and NACK messages corresponding to the received transport blocks in the downlink. For spatial multiplexing techniques, up to two transport blocks may be transmitted in a downlink subframe on a component carrier. For FDD, each downlink subframe can be associated with one unique uplink subframe, wherein the PUCCH is transmitted. For TDD, the number of downlink subframes may be larger than the number of uplink subframes, thus several downlink subframes may be associated with one unique uplink subframe. Hence, an uplink subframe may need to carry HARQ information corresponding to multiple downlink subframes in the PUCCH in TDD.

It is thus a problem to allocate uplink transmit resources for HARQ feedback in carrier aggregation of TDD and FDD, such that resources are unique for different subframes while minimizing the uplink resource overhead.

Several PUCCH signalling formats exist which may carry HARQ feedback in LTE-Advanced. One type of PUCCH format utilizes Quadrature Phase-Shift Keying (QPSK) or Binary Phase-Shift Keying (BPSK) modulated sequences such as i.e., format 1a/1b. When extended with selection from multiple (up to four) sequences (i.e., format 1b with channel selection), four HARQ-ACK bits may be conveyed. These formats are used both with and without carrier aggregation and are able to provide HARQ feedback for up to two component carriers, which is the most practical case in reality considering the UE complexity. Another type of PUCCH format is DFT spread OFDM (i.e., format 3) which is capable of carrying more HARQ feedback (e.g., 20 HARQ-ACK bits). The UE is configured by the radio network node whether it may use PUCCH format 3 or the PUCCH format 1b based schemes. However, PUCCH format 3 may not be needed if only two component carriers are aggregated.

For TDD, the frame structure comprises, in addition to normal subframes, special subframes which contain a first part for downlink transmissions; Downlink Pilot Time Slot (DwPTS), a second part for Guard Period (GP) and last part for uplink transmissions; Uplink Pilot Time Slot (UpPTS), see FIG. 1C. The duration of the different parts may vary and may be configurable by the system.

A downlink subframe is illustrated in FIG. 1D and an uplink subframe is illustrated FIG. 1E.

Thus, for TDD, M=1, 2, 3 or 4 downlink subframes may be associated with an uplink subframe. For aggregating two component carriers with spatial multiplexing on each carrier, there may thus be up to 4*2*2=16 HARQ-ACK bits in one subframe, which cannot be accommodated using PUCCH format 1b with channel selection. Therefore, various forms of HARQ information compression techniques are utilized to reduce the number of HARQ-ACK bits. For example, a logical AND operation among HARQ-ACK bits may be performed either among transport blocks (spatial bundling) in a subframe, across subframes (time-domain bundling) or across component carriers. A drawback is that a bundled NACK implies that a retransmission has to be performed for all transport blocks in the bundle. The consequence would therefore be lower throughput and less spectral efficiency. Bundling is predominately a problem for TDD, since for FDD, at most four HARQ-ACK bits need to be accommodated (assuming two component carriers with spatial multiplexing), which can be handled with format 1b with channel selection without bundling.

For TDD, a component carrier is configured with one out of seven UL-DL configurations, defining the transmission direction of the subframes in the radio frame. A radio frame comprises downlink subframes, uplink subframes and special subframes. The special subframes contain one part for downlink transmission, a guard period and one part for uplink transmission. The number of downlink subframes, M, for which an uplink subframe may transmit HARQ feedback is dependent on the TDD UL-DL configuration as well as the index of the specific uplink subframe. In practice, the same UL-DL configuration has to be used in neighboring cells in order to avoid UE-to-UE and eNodeB-to-eNodeB interference. Thus it is not straightforward to reconfigure the UL-DL configuration, e.g., in order to adapt to the traffic load. However, LTE-Advanced also allows the possibility to dynamically change the direction of a subframe. This may be denoted as a flexible subframe. For example, an indication may be given to UEs that are capable of such dynamic subframe direction change, to utilize a subframe for downlink transmission even though it is an uplink subframe according to the cell-specific UL-DL configuration. If an uplink subframe has been used as a flexible subframe for downlink transmission, there is no associated uplink subframe for the corresponding HARQ information according to the cell-specific UL-DL configuration and such UEs may follow a different HARQ timing (e.g., that of another reference TDD UL-DL configuration) than that of the given UL-DL configuration.

The PDCCH/EPDCCH comprise the Downlink Control Information (DCI) related to the PDSCH transmission. This comprises, e.g., HARQ process number (3 bits for FDD and 4 bits for TDD). For TDD there is also a Downlink Assignment Index (DAI) of 2 bits. For DCI containing downlink assignments, the DAI works as an incremental counter denoting the accumulative number of PDCCHs/EPDCCHs with assigned PDSCH transmission(s) and PDCCH/EPDCCH indicating SPS release, up to the present subframe of the bundling window. For DCI containing uplink grants, the DAI indicates the total number of subframes with PDSCH(s) and PDCCHs/EPDCCHs indicating SPS release that were transmitted during the bundling window of M downlink subframes. With the DAI information, the UE may be able to detect whether it has missed receiving any PDSCH or PDCCH/EPDCCH (except the last one) and if it may correspondingly transmit a bundled ACK or NACK.

PUCCH format 1b with channel selection assumes that a set of channels (i.e., sequences, or PUCCH resources) are reserved for the UE and as a way of encoding the HARQ message, it selects one of the channels, which is then modulated with a QPSK symbol. With up to four channels reserved, at most four HARQ-ACK bits (i.e., 16 unique states of HARQ information) can be provided. The PUCCH resource reservation can be performed implicitly by a mapping from the time-frequency resources occupied by the PDCCH/EPDCCH to the PUCCH resources. Implicit resource reservation is used when the PDCCH/EPDCCH is located on the PCell, either scheduling the PDSCH on the PCell or on the SCell by so called cross-carrier scheduling. Explicit resource reservation is utilised if the PDCCH/EPDCCH is located on the SCell or for SPS transmission of PDSCH on the PCell, for which there is no PDCCH/EPDCCH. For explicit resource reservation, two bits in the PDCCH/EPDCCH indicate one or two higher-layer configured resources which may be reserved. These two bits are obtained by reusing the two bits of the Transmit Power Control (TPC) field related to the PUCCH. Consequently, TPC commands cannot be signaled in the DCI when the PDCCH/EPDCCH is transmitted on the SCell.

For TDD, with a capability of transmitting only four HARQ-ACK bits (i.e., 16 HARQ states), it is not possible to represent all combinations of ACK, NACK and DTX states for two component carriers when M>1. Therefore, spatial bundling is used when M>1. However, when M>2, spatial bundling is not sufficient and a form of time-domain bundling is also performed and separate tables are given for M=3 and M=4. The time-domain bundling in this case corresponds to prioritizing HARQ states representing subframes having consecutive ACKs and associating such states with unique channel and modulation combinations.

In the uplink, the UE is also able to send a Scheduling Request (SR) when it has uplink data to transmit. The SR may be provided on a higher-layer configured channel (i.e., sequence or PUCCH resource). At most two bits may be conveyed on the SR resource, assuming QPSK modulation. If the UE is supposed to transmit HARQ information together with the SR, channel selection cannot be performed and the HARQ-ACK bits are bundled such that at most 2 bundled bits remain. This amounts to selecting only a modulation symbol (i.e., QPSK symbol representing the two bits) and transmitting it on the allocated SR resource. For FDD, this is facilitated by spatial bundling. Moreover, the spatial bundling is always performed such that only one HARQ-ACK bit is transmitted per serving cell, even though two non-bundled HARQ-ACK bits could be transmitted. That is, even if there is no transmission on the SCell (PCell), spatial bundling is performed on the HARQ-ACK bits on the PCell (SCell). This is to avoid the case where the radio network node has performed a transmission (and is thus expecting bundled HARQ information) while the UE missed the transmission. For TDD, the bundling comprises feeding back the number of ACKs among all the transport blocks, subframes and component carriers. However, this bundling mapping is not unique since ten such states are associated with only two bundled HARQ-ACK bits. Therefore, the radio network node may not easily be able to determine which transmissions that were received correctly and the probability for retransmission of all transport blocks is non-negligible.

In order to minimize the complexity in the UE, it would be beneficial to support downlink carrier aggregation of one FDD carrier and one TDD carrier utilizing HARQ feedback by format 1b with channel selection. Current HARQ feedback with PUCCH format 1b with channel selection for TDD involves significant HARQ bundling which should be avoided and especially to avoid introducing bundling for the FDD carrier in a joint feedback method.

It is a problem to define a method for simultaneous joint HARQ feedback for an FDD carrier and a TDD carrier.

It is a further problem to reduce the amount of bundling when a Scheduling Request (SR) is transmitted with HARQ information. Hence, it is a general problem to assure that there is a reasonable trade-off between control channel overhead and performance.

SUMMARY

It is therefore an object to obviate at least some of the above-mentioned disadvantages and to improve the performance in a wireless communication system.

This and other objects are achieved by the features of the appended independent claims. Further implementation forms are apparent from the dependent claims, the description and the figures.

According to a first aspect, a method is provided in a radio network node, for data transmission and assignment of uplink control channel resources in an uplink Frequency-Division Duplexing (FDD) carrier, for enabling a recipient to provide Hybrid Automatic Repeat request (HARQ) feedback for data transmitted in the downlink using carrier aggregation of a downlink FDD carrier and at least one Time-Division Duplexing (TDD) carrier, wherein the method comprises associating each downlink subframe in the downlink FDD carrier with an uplink control channel subframe in the uplink FDD carrier. The method also comprises associating each downlink subframe and special subframe in the TDD carrier with an uplink control channel subframe in the uplink FDD carrier. In addition, the method furthermore comprises assigning uplink control channel resources in the uplink FDD carrier to the recipient, according to the made associations. Furthermore the method also comprises transmitting data on said downlink FDD carrier and/or TDD carrier, to be received by the recipient.

In a first possible implementation of the method according to the first aspect, each downlink subframe and special subframe in the TDD carrier is associated with an uplink control channel subframe in the uplink FDD carrier in a one-to-one manner.

In a second possible implementation of the method according to the first aspect, each downlink subframe and special subframe in the TDD carrier is associated with an uplink control channel subframe in the uplink FDD carrier in a many-to-one manner.

In a third possible implementation of the method according to the first aspect, or any previous possible implementation of the method according to the first aspect, the recipient may be enabled to provide HARQ feedback by selection of a sequence and a modulation symbol, or selection of a modulation symbol to form a HARQ message in the uplink subframe of the uplink FDD carrier.

In a fourth possible implementation of the method according to the first aspect, or any previous possible implementation of the method according to the first aspect, the association mapping from HARQ information to modulation symbol and/or sequence may be independent of duplexing method of the carrier.

In a fifth possible implementation of the method according to the first aspect, or any previous possible implementation of the method according to the first aspect, the association of each downlink subframe in the downlink FDD carrier and the association of each downlink subframe and special subframe in the TDD carrier with an uplink control channel subframe in the uplink FDD carrier may generate at least one uplink subframe in the uplink FDD carrier comprising only HARQ feedback related to the downlink FDD carrier.

In a sixth possible implementation of the method according to the first aspect, or any previous possible implementation of the method according to the first aspect, the HARQ feedback for a downlink subframe n may be transmitted on the uplink control channel subframe in the uplink FDD carrier number n+ an offset value k.

In a seventh possible implementation of the method according to the sixth possible implementation of the method according to the first aspect, the offset value k may be set to 4.

In an eighth possible implementation of the method according to the first aspect, or any previous possible implementation of the method according to the first aspect, the carrier aggregation comprises one downlink FDD carrier and two TDD carriers, and wherein the total number of downlink subframes and special subframes of the two TDD carriers together does not exceed the total number of uplink subframes in the uplink FDD carrier, per radio frame.

In a ninth possible implementation of the method according to the first aspect, or any previous possible implementation of the method according to the first aspect, the association mapping from HARQ information to modulation symbol and sequence for the FDD carriers and TDD carrier may be based on the FDD and/or TDD HARQ-ACK procedures specified in 3rd Generation Partnership Project (3GPP) Long Term Evolution (LTE) Advanced standard 3GPP TS 36.213, for FDD carriers and/or TDD carriers.

In a tenth possible implementation of the method according to the first aspect, or any previous possible implementation of the method according to the first aspect, HARQ information may be transmitted on a scheduling request resource in the uplink of the uplink FDD carrier, and wherein spatial bundling may be performed in uplink subframes which are assigned for HARQ feedback of both the downlink FDD carrier and the TDD carrier; and spatial bundling may not be performed in uplink subframes which are assigned for HARQ feedback of the downlink FDD carrier.

In an eleventh possible implementation of the method according to the first aspect, or any previous possible implementation of the method according to the first aspect, the type of uplink subframe on the uplink FDD carrier may be determined from a higher layer configured entity or by a downlink control channel.

In a twelfth possible implementation of the method according to the first aspect, or any previous possible implementation of the method according to the first aspect, the offset value k for providing HARQ feedback on the uplink subframe on the uplink FDD carrier may be determined from a higher layer configured entity or by a downlink control channel.

In a thirteenth possible implementation of the method according to the first aspect, or any previous possible implementation of the method according to the first aspect, any HARQ feedback on the uplink subframe on the uplink FDD carrier may not relate to any spatial subframe bundling for the TDD carrier.

In a fourteenth possible implementation of the method according to the first aspect, or any previous possible implementation of the method according to the first aspect, wherein the subframe in the TDD carrier, associated with an uplink control channel subframe in the uplink FDD carrier, may be determined from a higher layer configured entity, or by a downlink control channel.

In a fifteenth possible implementation of the method according to the first aspect, or any previous possible implementation of the method according to the first aspect, the Downlink Control Information (DCI) in the downlink control channel associated with the TDD carrier may not comprise any Downlink Assignment Index (DAI).

In a sixteenth possible implementation of the method according to the first aspect, or any previous possible implementation of the method according to the first aspect, the DCI in the downlink control channel of the TDD carrier may comprise bits with predefined values.

In a seventeenth possible implementation of the method according to the first aspect, or any previous possible implementation of the method according to the first aspect, the DCI in the downlink control channel of the TDD carrier may comprise bits dedicated for transmission power control.

In an eighteenth possible implementation of the method according to the first aspect, or any previous possible implementation of the method according to the first aspect, HARQ feedback may be received from the recipient, related to the transmitted data, on the uplink control channel resource in the uplink FDD carrier assigned to the recipient.

In a nineteenth possible implementation of the method according to the first aspect, or any previous possible implementation of the method according to the first aspect, the radio network node may comprise an enhanced NodeB in an LTE system; the recipient may comprise a User Equipment (UE); the downlink subframe may comprise a Physical Downlink Shared Channel (PDSCH) in the downlink FDD carrier; the downlink subframe may comprise a Physical Downlink Shared Channel (PDSCH) in the TDD carrier; the uplink control channel subframe may comprise a Physical Uplink Control Channel (PUCCH) in the uplink FDD carrier.

In a second aspect, a radio network node is provided for data transmission and assignment of uplink control channel resources in a downlink FDD carrier, for enabling a recipient to provide HARQ feedback for data transmitted in the downlink using carrier aggregation of the downlink FDD carrier and at least one TDD carrier. The radio network node comprises a processor, configured for associating each downlink subframe in the downlink FDD carrier with an uplink control channel subframe in the uplink FDD carrier; and also configured for associating each downlink subframe and special subframe in the TDD carrier with an uplink control channel subframe in the uplink FDD carrier; and furthermore configured for assigning uplink control channel resources in the uplink FDD carrier to the recipient, according to the made associations. Further, the radio network node comprises a transmitter, configured for transmitting data on said downlink FDD carrier and/or TDD carrier, to be received by the recipient.

In a first possible implementation of the second aspect, the processor may be further configured for associating each downlink subframe and special subframe in the TDD carrier with an uplink control channel subframe in the uplink FDD carrier in a one-to-one manner.

In a second possible implementation of the second aspect, the processor may be further configured for associating each downlink subframe and special subframe in the TDD carrier with an uplink control channel subframe in the uplink FDD carrier in a many-to-one manner.

In a third possible implementation of the second aspect, or any previous possible implementation of the second aspect, the radio network node also may comprise a receiver, configured for receiving HARQ feedback from the recipient, related to the transmitted data, on the uplink control channel resource in the uplink FDD carrier assigned to the recipient.

According to a third aspect, a method is provided in a recipient for providing HARQ feedback for data received in the downlink using carrier aggregation of a downlink FDD carrier and at least one TDD carrier, in an uplink control channel resource in an uplink FDD carrier, which method comprises receiving data on subframes on a downlink data channel of a downlink FDD carrier and/or a downlink subframe on a downlink data channel of TDD carrier. Also, the method comprises determining whether the data has been correctly received, or not. In addition, the method furthermore comprises selecting a sequence and a modulation symbol, or selecting a modulation symbol, to form a HARQ message in the uplink subframe of the uplink FDD carrier, corresponding to an ACK for data determined to have been correctly received, a NACK for data determined to not having been correctly received and/or a DTX, for data not having been received, and transmitting HARQ feedback related to the received data, on the uplink control channel resource in the uplink FDD carrier assigned to the recipient, comprising the selected sequence and modulation symbol, or the selected modulation symbol in the HARQ message.

In a first possible implementation of the third aspect, the HARQ feedback is provided by selection of a sequence and a modulation symbol, or selection of a modulation symbol to form a HARQ message in the uplink subframe of the uplink FDD carrier.

In a second possible implementation of the third aspect, or any previous implementation of the third aspect, the association mapping from HARQ information to sequence and modulation symbol may be independent of duplexing method of the carrier.

In a third possible implementation of the third aspect, or any previous implementation of the third aspect, the carrier aggregation may comprise one downlink FDD carrier and two TDD carriers, and wherein the total number of downlink subframes and special subframes may not exceed the total number of uplink subframes in the uplink FDD carrier, per radio frame.

In a fourth possible implementation of the third aspect, or any previous implementation of the third aspect, the association mapping from HARQ information to modulation symbol and sequence for the FDD carriers and TDD carrier may be based on the FDD and/or TDD HARQ-ACK procedures specified in 3GPP LTE-Advanced standard 3GPP TS 36.213, for FDD carriers and/or TDD carriers.

In a fifth possible implementation of the third aspect, or any previous implementation of the third aspect, the HARQ feedback may be transmitted on a scheduling request resource in the uplink of the uplink FDD carrier, and wherein spatial bundling may be performed in uplink subframes which are assigned for HARQ feedback of both the downlink FDD carrier and the TDD carrier; and spatial bundling may not be performed in uplink subframes which are assigned for HARQ feedback of the downlink FDD carrier.

In a sixth possible implementation of the third aspect, or any previous implementation of the third aspect, the type of uplink subframe on the uplink FDD carrier may be determined from a higher layer configured entity or by a downlink control channel.

In a seventh possible implementation of the third aspect, or any previous implementation of the third aspect, the radio network node may comprise an enhanced NodeB in an LTE system; the recipient may comprise a user equipment (UE); the downlink subframe may comprise a Physical Downlink Shared Channel (PDSCH) in the downlink FDD carrier; the downlink subframe may comprise a Physical Downlink Shared Channel (PDSCH) in the TDD carrier; the uplink control channel subframe may comprise a Physical Uplink Control Channel, PUCCH, in the uplink FDD carrier.

According to a fourth aspect, a recipient, for providing HARQ feedback for data received in the downlink using carrier aggregation of a downlink FDD carrier and at least one TDD carrier, in an uplink control channel resource in an uplink FDD carrier is provided. The recipient comprises a receiver, configured for receiving data on downlink subframes on a downlink data channel of a FDD carrier and/or on downlink subframes on a downlink data channel of a TDD carrier. Further, the recipient comprises a processor, configured for determining whether the data has been correctly received, or not, and also configured for selecting a sequence or a modulation symbol to form a HARQ message in the uplink subframe of the uplink FDD carrier, corresponding to an ACK for data determined to have been correctly received, a NACK for data determined to not having been correctly received and/or a DTX for data not having been received. In addition the recipient comprises a transmitter, configured for transmitting HARQ feedback related to the received data, on the uplink control channel resource in the uplink FDD carrier assigned to the recipient, comprising the selected sequence and modulation symbol, or the selected modulation symbol in the HARQ message.

Thanks to the herein described aspects, it is possible to provide HARQ feedback on data transmitted by carrier aggregation of signals transmitted on an FDD carrier and at least one TDD carrier. By providing the HARQ feedback on the uplink FDD carrier, problems associated with TDD HARQ feedback, such as the frequent use of bundling, large DCI format, and more frequent transmission of scheduling request together with HARQ feedback, are avoided. Thereby, the amount of bundling may be reduced, leading to that less data has to be re-sent when an error is detected. Thus an improved performance within a wireless communication system is provided.

Other objects, advantages and novel features of the aspects of the invention will become apparent from the following detailed description.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Embodiments of the invention described herein are defined as a radio network node and a method in a radio network node, a recipient and a method in the recipient which may be put into practice in the embodiments described below. These embodiments may, however, be exemplified and realized in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1A:
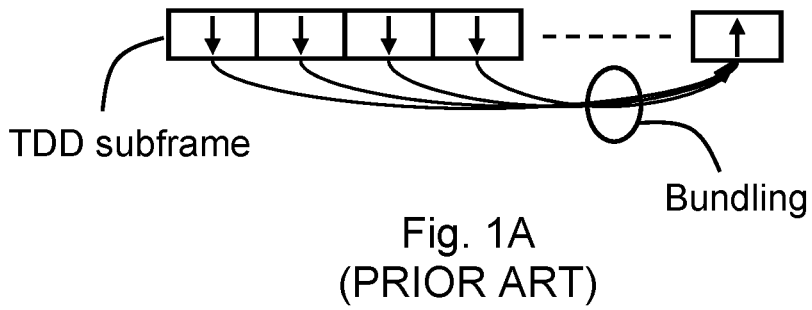
FIG. 1A is an illustration of TDD subframes according to prior art.
Figure 1B:
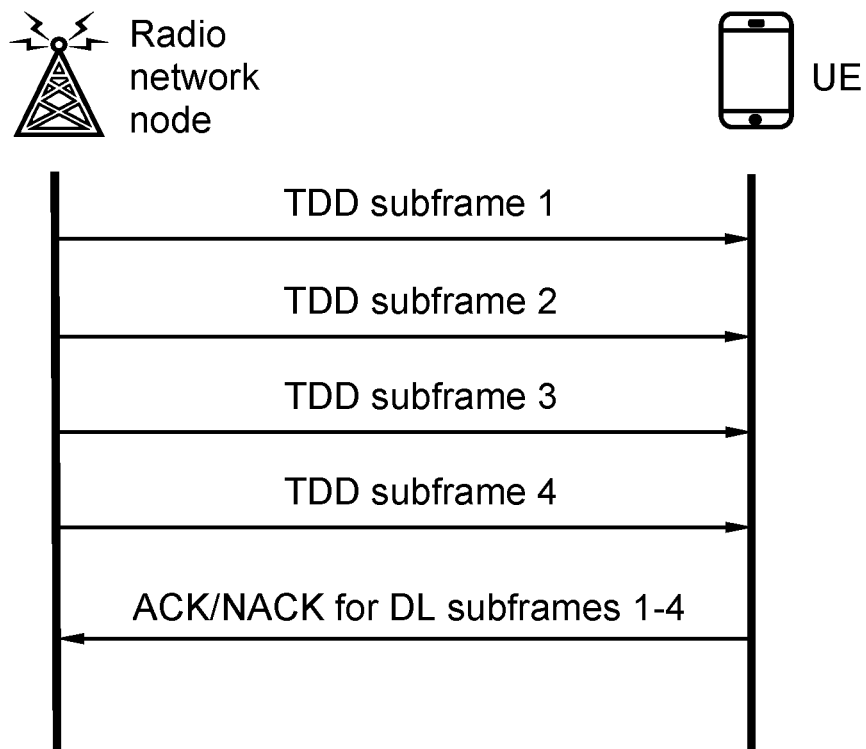
FIG. 1B is an illustration of TDD subframes according to prior art.
Figure 1C:
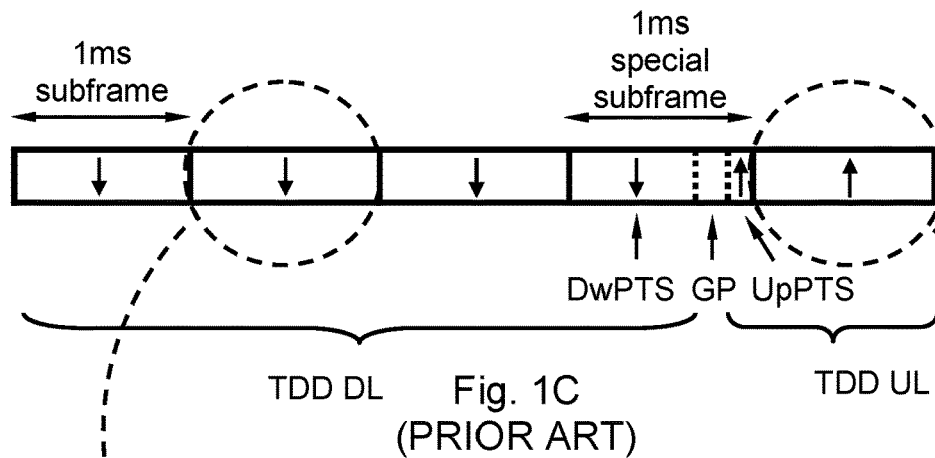
FIG. 1C is a block diagram illustrating a TDD radio frame according to prior art.
Figure 1D:
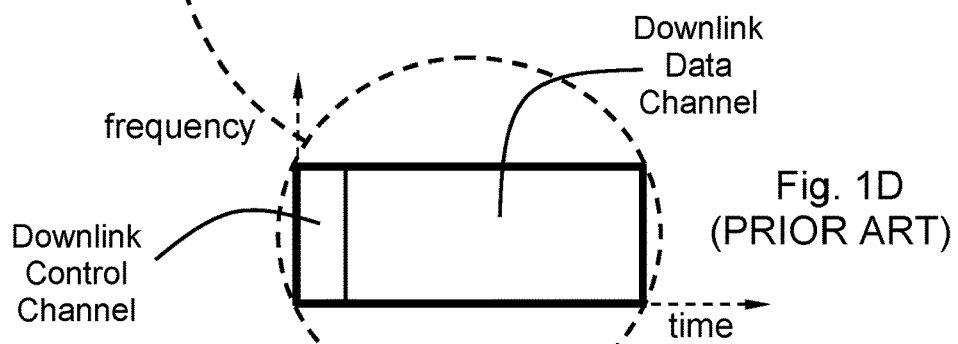
FIG. 1D is a block diagram illustrating a downlink subframe according to prior art.
Figure 1E:
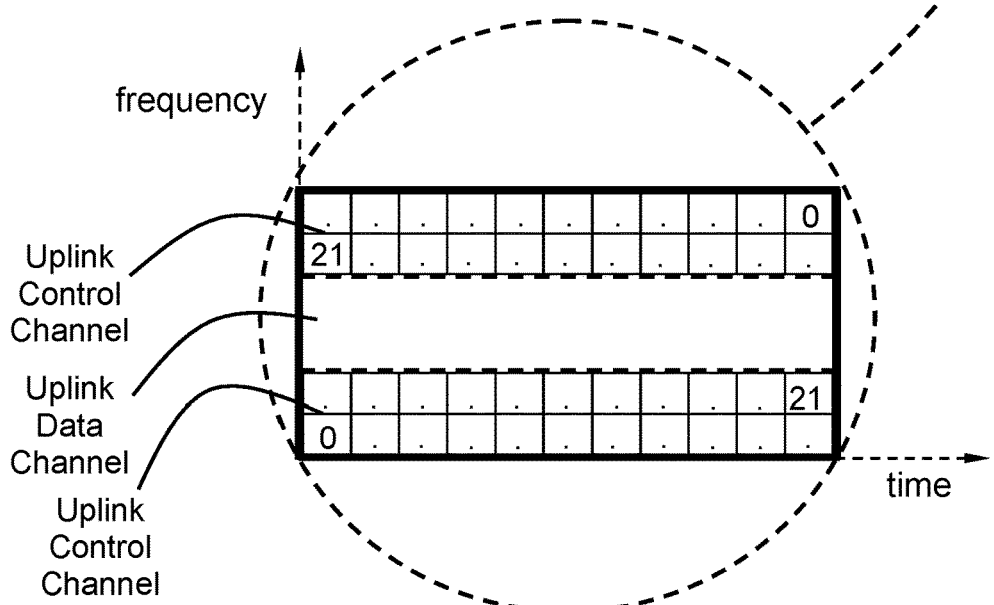
FIG. 1E is a block diagram illustrating an uplink subframe according to prior art.
Figure 2:
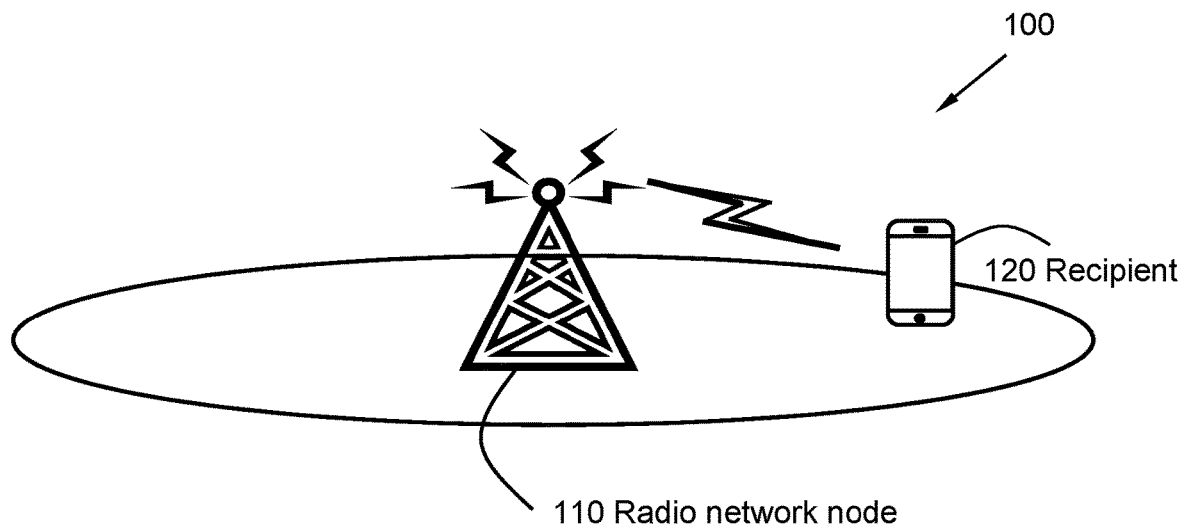
FIG. 2 is a block diagram illustrating a wireless communication system according to some embodiments.

FIG. 2 is a schematic illustration over a wireless communication system 100 comprising a radio network node 110 communicating with a recipient 120, which is served by the radio network node 110.

The wireless communication system 100 may at least partly be based on radio access technologies such as, e.g., 3GPP LTE, LTE-Advanced, Evolved Universal Terrestrial Radio Access Network (E-UTRAN), Universal Mobile Telecommunications System (UMTS), Global System for Mobile Communications (originally: Groupe Special Mobile) (GSM)/Enhanced Data rate for GSM Evolution (GSM/EDGE), Wideband Code Division Multiple Access (WCDMA), Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1×RTT and High Rate Packet Data (HRPD), just to mention some few options. The expressions "wireless communication network", "wireless communication system" and/or "cellular telecommunication system" may within the technological context of this disclosure sometimes be utilized interchangeably.

The wireless communication system 100 may be configured for carrier aggregation of a Frequency Division Duplex (FDD) carrier and at least one Time Division Duplex (TDD) carrier, according to different embodiments, in the downlink.

The purpose of the illustration in FIG. 2 is to provide a simplified, general overview of the wireless communication system 100 and the involved methods and nodes, such as the radio network node 110 and recipient 120 herein described, and the functionalities involved. The method and wireless communication system 100 will subsequently, as a non-limiting example, be described in a 3GPP LTE/LTE-Advanced environment, but the embodiments of the disclosed method and wireless communication system 100 may be based on another access technology such as, e.g., any of the above already enumerated. Thus, although embodiments of the invention may be described based on, and using the lingo of, 3GPP LTE systems, it is by no means limited to 3GPP LTE.

The illustrated wireless communication system 100 comprises the radio network node 110, which may send radio signals to be received by the recipient 120.

It is to be noted that the illustrated network setting of one radio network node 110 and one recipient 120 in FIG. 2 is to be regarded as a non-limiting example of an embodiment only. The wireless communication system 100 may comprise any other number and/or combination of radio network nodes 110 and or recipient 120. A plurality of recipients 120 and another configuration of radio network nodes 110 may thus be involved in some embodiments of the disclosed invention.

Thus whenever "one" or "a/an" recipient 120 and or radio network node 110 is referred to in the present context, a plurality of recipients 120 and or radio network nodes 110 may be involved, according to some embodiments.

The radio network node 110 may according to some embodiments be configured for downlink transmission and may be referred to, respectively, as e.g., a base station, NodeB, evolved Node Bs (eNB, or eNodeB), base transceiver station, Access Point Base Station, base station router, Radio Base Station (RBS), micro base station, pico base station, femto base station, Home eNodeB, sensor, beacon device, relay node, repeater or any other network node configured for communication with the recipient 120 over a wireless interface, depending, e.g., of the radio access technology and/or terminology used.

The recipient 120 may correspondingly be represented by, e.g. a User Equipment (UE), a wireless communication terminal, a mobile cellular phone, a Personal Digital Assistant (PDA), a wireless platform, a mobile station, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the radio network node 110, according to different embodiments and different vocabulary.

Some embodiments of the invention defines a method for providing HARQ information transmission for carrier aggregation of one FDD carrier and at least one TDD carrier, by selection of (QPSK) modulated sequences to form HARQ messages, where each field in the HARQ message corresponds to one transport block.

Each downlink subframe and special subframe in the TDD carrier may be associated in a one-to-one manner with an uplink subframe in the FDD carrier, in which HARQ information transmission for the TDD and the FDD carrier is supported. However, according to some alternative embodiments, each downlink subframe and special subframe in the TDD carrier may be associated in a many-to-one manner with an uplink subframe in the FDD carrier, in which HARQ information transmission for the TDD and the FDD carrier is supported.

Further, the association mapping from HARQ information to modulation symbol and/or sequence may be the same regardless of subframe and duplexing method of a carrier. In addition, the HARQ information is transmitted on the FDD carrier.

The method may be applicable to carrier aggregation of one FDD carrier and one TDD carrier in some embodiments. The method may also be applicable to carrier aggregation of one FDD carrier and at least two TDD carriers, where the total number of downlink subframes and special subframes of the TDD carriers in a radio frame, does not exceed the total number of uplink subframes in the FDD carrier per radio frame.

The method may in some embodiments be applied within LTE-Advanced, where Table 1, 2 and/or 3 may be used as the association mapping from HARQ information to modulation symbol and/or sequence for the FDD carrier and the TDD carrier.

The method may be extended for HARQ transmission on one Scheduling Request (SR) resource, where the scheduling request is transmitted on the uplink FDD carrier.

Furthermore, in some embodiments, when transmitting HARQ feedback on the scheduling request resource, spatial bundling may be performed in uplink subframes which are defined for HARQ feedback of both the downlink FDD carrier and the TDD carrier, while spatial bundling may not be performed in uplink subframes which are defined for HARQ feedback of the uplink FDD carrier.

The type of uplink subframe on the uplink FDD carrier may be determined from either a higher layer configured entity, e.g., a TDD UL-DL configuration or a bitmap, or by a downlink control channel according to different embodiments.

The method where the associated DCI format for the TDD carrier may not utilize a DAI, e.g., where the DAI field is non-existing, may in some embodiments be set to a predefined value or is used for other purposes such as power control bits.

Figure 3:
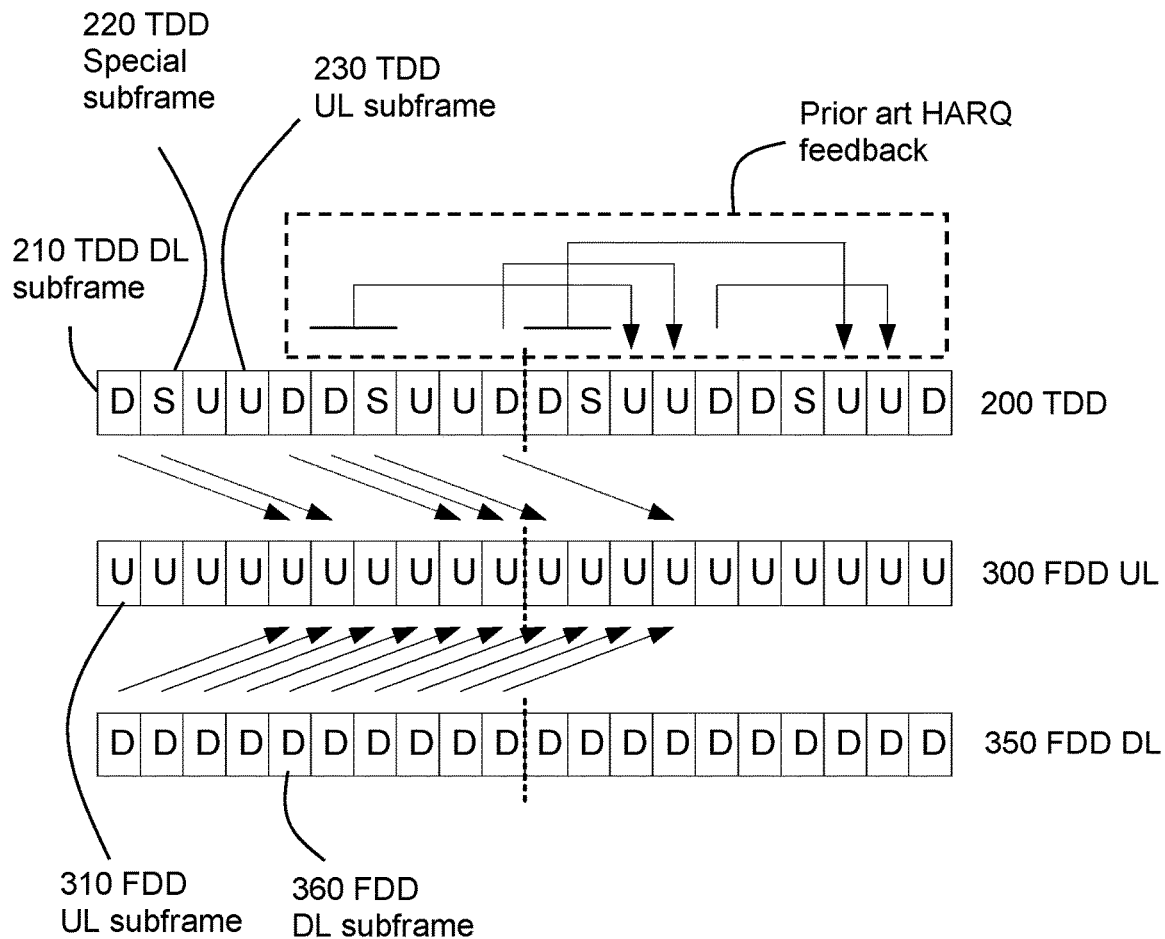
FIG. 3 is a block diagram illustrating radio frames in TDD/FDD according to some embodiments.

FIG. 3 is a schematic illustration over radio frames in TDD/FDD according to some embodiments. In the illustrated example, two radio frames comprising 10 subframes each for TDD uplink/downlink configuration 1 is depicted. Further, two radio frames comprising 10 subframes each for FDD uplink and downlink configurations respectively is illustrated.

The upper part shows the HARQ timing of the TDD carrier 200 in LTE-Advanced according to prior art. The middle part and lower part shows an example of the invention and timing where HARQ may be transmitted on an uplink FDD carrier 300 in some embodiments.

The TDD radio frames in the TDD carrier 200 comprises TDD downlink subframes 210, TDD special subframes 220 and TDD uplink subframes 230. The uplink FDD carrier 300 comprises uplink subframes 310 while the downlink FDD carrier 350 comprises downlink subframes 360.

The HARQ feedback signalling for TDD has, in comparison to FDD, a number of issues, such that spatial-, component carrier- and time-domain bundling are frequently used. This is known to reduce the spectral efficiency of the system since unnecessary data retransmissions may occur. The reduction is in particular when there is low correlation between the channels among the transmissions for which the bundled HARQ feedback is applied. For example, the inter-cell interference and channel fading may be completely different among subframes or among component carriers, causing losses for subframe and carrier bundling. Further, the DCI format is larger for TDD. A larger DCI format decreases the coverage of the control channel and thereby reduces the feasible area over which carrier aggregation between TDD and FDD may be used. Furthermore, for TDD, there are fewer uplink subframes in a radio frame, which increases the probability that a scheduling request will be transmitted in an uplink subframe also carrying HARQ feedback. However, the joint transmission of a scheduling request and HARQ feedback relies on significant amount of HARQ bundling, which degrades performance.

Therefore, in support of joint HARQ feedback for FDD and TDD carrier aggregation, it is desirable to not introduce unnecessary bundling (or larger DCI sizes) only because one of the carriers uses TDD. Instead, it is realized, in some embodiments that it is preferable to incorporate more of the FDD HARQ mechanisms, which do not heavily rely on bundling.

In order to avoid bundling HARQ information, it may be beneficial to limit the value of M to 1 subframe for the both the TDD carrier 200 and the downlink FDD carrier 350, which would result in at most 2 HARQ bits per component carrier. One characterizing feature of some embodiments may thus be that each downlink subframe 210 or special subframe 220 in a TDD carrier 200 is associated in a one-to-one manner with an uplink subframe 310 in the uplink FDD carrier 300, which comprises the PUCCH. Such a one-to-one relation may be facilitated by transmitting HARQ feedback on the PUCCH in subframe n+k for a PDSCH (or PDCCH/EPDCCH denoting SPS release) which was received in subframe n. The offset value k may be subframe-dependent, i.e., be dependent on n. On the other hand, it may also be fixed, e.g., k=4 which is the value used for FDD in prior art. Hence, this timing may also be applied to a TDD carrier 200 and is possible if the PUCCH is transmitted on the uplink FDD carrier 300, as there is always an existing corresponding uplink subframe 310 for any downlink subframe 360 number n. One advantage of using a one-to-one relation for determining the uplink subframes may be that the HARQ feedback corresponding to the TDD carrier is distributed over as many subframes as possible in the uplink FDD carrier. That is, it avoids concentrating HARQ feedback of multiple subframes of the TDD carrier to a small number of subframes in the uplink FDD carrier. This is beneficial as it makes the PUCCH load more even among subframes and provides robustness against bursty channel impairments such as fading dips and severe temporal interference variations.

In one possible embodiment, the one-to-one mapping may be obtained by predefined values of k. The predefined values may be dependent on, e.g., a subframe index, a TDD UL-DL configuration and the number of aggregated carriers. In another embodiment, the one-to-one mapping may be obtained by higher layer configuration.

However, it is to be noted that each downlink subframe 210 or special subframe 220 in the TDD carrier 200 alternatively may be associated in a many-to-one manner with an uplink subframe 310 in the uplink FDD carrier 300, which comprises the PUCCH. Thus a plurality of TDD downlink subframes 210 and/or special subframes 220 may be associated with one uplink subframe 310 in the uplink FDD carrier 300, in some alternative embodiments.

FIG. 3 further shows an example of two TDD radio frames using UL-DL configuration 1 and the upper arrows denote the HARQ timing of the TDD carrier 200 of prior art LTE-Advanced. In the middle part, an example of an embodiment is illustrated where each downlink subframe 210 and/or special subframe 220 in the TDD carrier 200 is associated with an uplink subframe 310 in the uplink FDD carrier 300 with the same HARQ timing as for the downlink FDD carrier 350 in a one-to-one mapping. However, other one-to-one mappings and/or many-to-one mappings may also be possible in different embodiments. In the lower part, the HARQ timing for the downlink FDD carrier 350 is illustrated.

It may be noted from FIG. 3 that there may exist some uplink subframes 310 in the uplink FDD carrier 300 which only may contain HARQ feedback from the downlink FDD carrier 350, i.e., only one of the aggregated carriers. This is in contrast to prior art carrier aggregation of FDD carriers, where all uplink subframes in an FDD carrier can contain feedback for both FDD carriers.

Tables 1, 2 and 3 show the mapping in FDD of HARQ states to channels (PUCCH resources) and bit values of the QPSK symbols, for two, three and four HARQ fields, respectively. Table 1 applies for aggregating two component carriers, each comprising one transport block. Table 2 applies for aggregating two component carriers, where one component carrier comprises two transport blocks and one component carrier comprises one transport block. Table 3 applies for aggregating two component carriers, each comprising two transport blocks. Tables 1, 2 and 3 are constructed to exhibit several properties; there is no HARQ bundling (i.e., each HARQ-ACK field is associated with one transport block), implicit resource reservation is supported (i.e., implicit resources are not associated with HARQ states in DTX), and when there is only a PDSCH scheduled on the PCell (i.e., SCell is in DTX), channel selection is disabled (only one channel is used, i.e., $n_{PUCCH,0}^{(1)}$) and the signalling reduces to PUCCH format 1b.

Table 1 illustrates encodings for transmission of HARQ messages using two channels.

TABLE 1

| HARQ-ACK(0) | HARQ-ACK(1) | $n_{PUCCH}^{(1)}$ | b(0)b(1) |
|---|---|---|---|
| ACK | ACK | $n_{PUCCH,1}^{(1)}$ | 1, 1 |
| ACK | NACK/DTX | $n_{PUCCH,0}^{(1)}$ | 1, 1 |
| NACK/DTX | ACK | $n_{PUCCH,1}^{(1)}$ | 0, 0 |
| NACK | NACK/DTX | $n_{PUCCH,0}^{(1)}$ | 0, 0 |
| DTX | NACK/DTX | No Transmission | |

Table 2 illustrates encodings for transmission of HARQ messages using three channels.

TABLE 2

| HARQ-ACK(0) | HARQ-ACK(1) | HARQ-ACK(2) | $n_{PUCCH}^{(1)}$ | b(0)b(1) |
|---|---|---|---|---|
| ACK | ACK | ACK | $n_{PUCCH,1}^{(1)}$ | 1, 1 |
| ACK | NACK/DTX | ACK | $n_{PUCCH,1}^{(1)}$ | 1, 0 |
| NACK/DTX | ACK | ACK | $n_{PUCCH,1}^{(1)}$ | 0, 1 |
| NACK/DTX | NACK/DTX | ACK | $n_{PUCCH,2}^{(1)}$ | 1, 1 |
| ACK | ACK | NACK/DTX | $n_{PUCCH,0}^{(1)}$ | 1, 1 |
| ACK | NACK/DTX | NACK/DTX | $n_{PUCCH,0}^{(1)}$ | 1, 0 |
| NACK/DTX | ACK | NACK/DTX | $n_{PUCCH,0}^{(1)}$ | 0, 1 |
| NACK/DTX | NACK/DTX | NACK | $n_{PUCCH,2}^{(1)}$ | 0, 0 |
| NACK | NACK/DTX | DTX | $n_{PUCCH,0}^{(1)}$ | 0, 0 |
| NACK/DTX | NACK | DTX | $n_{PUCCH,0}^{(1)}$ | 0, 0 |
| DTX | DTX | DTX | No Transmission | |

Table 3 illustrates encodings for transmission of HARQ messages using four channels.

TABLE 3

| HARQ-ACK(0) | HARQ-ACK(1) | HARQ-ACK(2) | HARQ-ACK(3) | $n_{PUCCH}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,}^{(1)}$ | 0, 1 |
| NACK/DTX | ACK | ACK | ACK | $n_{PUCCH,}^{(1)}$ | 0, 1 |
| NACK/DTX | NACK/DTX | ACK | ACK | $n_{PUCCH,}^{(1)}$ | 1, 1 |
| ACK | ACK | ACK | NACK/DTX | $n_{PUCCH,}^{(1)}$ | 1, 0 |
| ACK | NACK/DTX | ACK | NACK/DTX | $n_{PUCCH,}^{(1)}$ | 0, 0 |
| NACK/DTX | ACK | ACK | NACK/DTX | $n_{PUCCH,}^{(1)}$ | 0, 0 |
| NACK/DTX | NACK/DTX | ACK | NACK/DTX | $n_{PUCCH,}^{(1)}$ | 1, 0 |
| ACK | ACK | NACK/DTX | ACK | $n_{PUCCH,}^{(1)}$ | 1, 1 |
| ACK | NACK/DTX | NACK/DTX | ACK | $n_{PUCCH,}^{(1)}$ | 1, 0 |
| NACK/DTX | ACK | NACK/DTX | ACK | $n_{PUCCH,}^{(1)}$ | 0, 1 |
| NACK/DTX | NACK/DTX | NACK/DTX | ACK | $n_{PUCCH,}^{(1)}$ | 0, 0 |

TABLE 3-continued

| HARQ-ACK(0) | HARQ-ACK(1) | HARQ-ACK(2) | HARQ-ACK(3) | $n_{PUCCH}^{(1)}$ | b(0)b(1) |
|---|---|---|---|---|---|
| ACK | ACK | NACK/DTX | NACK/DTX | $n_{PUCCH,}^{(1)}$ | 1, 1 |
| ACK | NACK/DTX | NACK/DTX | NACK/DTX | $n_{PUCCH,}^{(1)}$ | 1, 0 |
| NACK/DTX | ACK | NACK/DTX | NACK/DTX | $n_{PUCCH,}^{(1)}$ | 0, 1 |
| NACK/DTX | NACK | NACK/DTX | NACK/DTX | $n_{PUCCH,}^{(1)}$ | 0, 0 |
| NACK | NACK/DTX | NACK/DTX | NACK/DTX | $n_{PUCCH,}^{(1)}$ | 0, 0 |
| DTX | DTX | NACK/DTX | NACK/DTX | No Transmission | |

An advantage of some embodiments herein is that, if Tables 1, 2 and 3 are used for subframes where only HARQ-ACK for the FDD carrier should be transmitted, this situation equals that the HARQ fields for the TDD carrier 200 may be (DTX, DTX) for such uplink subframes. Inspection of Tables 1, 2 and 3 gives that this reduces to using PUCCH format 1b (i.e., the same fallback operation which is defined in the FDD system). Hence, it is an advantage of the method that already implemented HARQ feedback mechanisms in the recipient 120 may be reused for carrier aggregation of FDD and TDD carriers, while guaranteeing same HARQ feedback performance as previously defined.

It may further be realized that other HARQ-ACK mapping tables are feasible; the above described encodings are just examples. For example, the prior art LTE-Advanced system also comprises similar tables for the TDD system which may be applicable. In particular, there are tables corresponding to M=1 which do not encompass any form of bundling, which may be applicable also for carrier aggregation of FDD and TDD carriers.

Assuming the one-to-one relation, it may be realized in one embodiment, that the usage of HARQ feedback bundling may be eliminated by using the association mapping for FDD of HARQ states to sequences and modulation symbols also for TDD. In one embodiment, Table 1, 2 and 3 may be utilized for HARQ feedback wherein one component carrier uses FDD and one component carrier uses TDD. In one example, the FDD carrier may be the PCell. In another example, the FDD carrier may be the SCell. For example, embodiments of the invention could apply Table 3 and associate HARQ-ACK(0) and HARQ-ACK(1) with the FDD carrier, while associating HARQ-ACK(2) and HARQ-ACK(3) with the TDD carrier. In another example, the invention according to an embodiment could apply Table 3 and associate HARQ-ACK(0) and HARQ-ACK(1) with the TDD carrier, while associating HARQ-ACK(2) and HARQ-ACK(3) with the FDD carrier. The skilled reader may produce similar examples from other HARQ mapping tables. Therefore, in one embodiment of the invention, the association mapping from HARQ information to modulation symbol and/or sequence may be the same regardless of subframe and duplexing method of a carrier.

However, in other embodiments a many-to-one relation may be established between downlink subframe(s) 210 and/or special subframe(s) 220 of the TDD carrier 200 to a FDD uplink subframe 310. Thus some HARQ feedback bundling may be utilized according to those embodiments.

Figure 4:
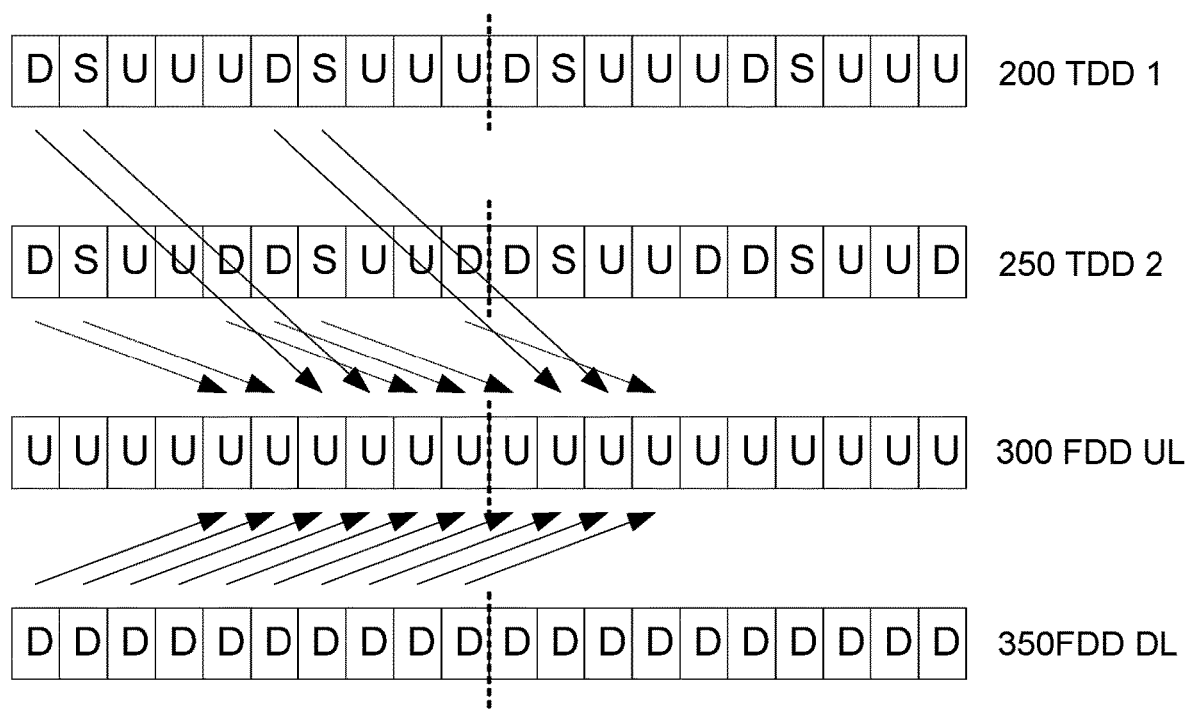
FIG. 4 is a block diagram illustrating radio frames in TDD/FDD according to some embodiments.

FIG. 4 illustrates an example of two radio frames (10 subframes each) and the HARQ timing for carrier aggregation using TDD UL/DL configuration 0 (top) 200, TDD UL-DL configuration 1 (middle) 250 and the UL/DL FDD carriers 300, 350 (bottom).

It may further be realized that some embodiments may be applicable to carrier aggregation with one downlink FDD carrier 350 and multiple TDD carriers 200, 250, for cases where it is possible to link every downlink subframe 210 and special subframe 220 of the TDD carriers 200 to a unique FDD uplink subframe 310. This is typically feasible if the total number of downlink subframe 210 and special subframe 220 of the TDD carriers 200, 250 per radio frame does not exceed the number of FDD uplink subframes 310 per radio frame. FIG. 4 illustrates one example wherein one TDD carrier 200 using TDD UL-DL configuration 0 is aggregated with another TDD carrier 250 using TDD UL-DL configuration 1, together with the downlink FDD carrier 350. This assures that an uplink subframe 310 will contain HARQ-ACK bits from at most two carriers. Hence, it is possible to utilize e.g. Table 1, 2 and/or 3, i.e., bundling may be completely avoided. This is in contrast to prior art, where PUCCH format 1b with channel selection only supports aggregation of two component carriers.

A further constraint for supporting carrier aggregation with multiple TDD carriers 200, 250 may be that the HARQ round trip time delay may not decrease from what currently is in the system. This may put limits on the combinations of number of carriers and their respective TDD UL-DL configurations. For example, it may be required that k≥4 for any subframe 210, 220, 230 of the TDD carriers 200, 250 in some embodiments.

One further aspect of the described method comprises joint transmission of scheduling request and HARQ feedback. It may be desirable to avoid the bundling operations (spatial, subframe, component carrier) which is performed in the prior art LTE-Advanced system for TDD. If there is a one-to-one relation between downlink subframes 210 in the TDD carrier 200, 250 to uplink subframes 310 in the uplink FDD carrier 300, it is realized that there may be at least one uplink subframe 310 in the uplink FDD carrier 300 which may be defined to only comprise HARQ information from the downlink FDD carrier 350 in some embodiments. However, in other alternative embodiments, there may be a many-to-one relation between downlink subframes 210 in the TDD carrier 200, 250 to uplink subframes 310 in the uplink FDD carrier 300. However, in some such embodiments, there may be at least one uplink subframe 310 in the uplink FDD carrier 300 which may be defined to only comprise HARQ information from the downlink FDD carrier 350.

In the following, two types of uplink subframes 310 on the uplink FDD carrier 300 are defined. Uplink subframes 310 which are defined for HARQ feedback of both the downlink FDD carrier 350 and the TDD carriers 200, 250; and uplink subframes 310 which are defined for HARQ feedback of only the downlink FDD carrier 350. This embodiment is illustrated in FIG. 3.

If an uplink subframe is defined for HARQ feedback of only the FDD carrier, at most two HARQ-ACK bits (assuming transmission of two transport blocks) need to be signaled together with the scheduling request. If an uplink subframe is defined for HARQ feedback of both the FDD and a TDD carrier, potentially up to four HARQ-ACK bits (two bits per carrier) need to be signaled together with the scheduling request, which is not possible without bundling. In case there are two such kinds of uplink subframes, the uplink subframe type may be required to be known both by the recipient 120 and by the radio network node 110, according to some embodiments.

In one embodiment, the uplink subframe type may be determined from the TDD UL-DL configuration and the designated HARQ timing for each downlink subframe 210 and special subframe 220 of the TDD carriers 200, 250.

Furthermore, in some embodiments, the usage of flexible subframes is considered. According to those embodiments, the transmission direction, i.e., uplink/downlink may be configurable/reconfigurable in order to, e.g., adapt to the radio traffic demands at the moment. In one embodiment of the invention, the type of uplink subframe 310 on the uplink FDD carrier 300 may be determined according to a higher layer Radio Resource Control (RRC) signaled entity. This entity may be in the form of a reference TDD UL-DL configuration (e.g., TDD UL-DL configuration 2 or TDD UL-DL configuration 5) and the uplink subframe type may be determined from the reference TDD UL-DL configuration and the designated HARQ timing for each downlink subframe 210 and special subframe 220 of the TDD carriers 200, 250. In a further example, the RRC entity may comprise a bitmap where the entries in the bit map indicate whether an associated subframe on the TDD carrier 200, 250 should be linked in a one-to-one, or many-to-one fashion according to previous embodiments, to an uplink subframe 310 in the uplink FDD carrier 300. An advantage of this form of signalling may be that higher layer RRC signalling is reliable and there would thus not be any ambiguity between the recipient 120 and radio network node 110 concerning the uplink subframe type.

In another example, a TDD UL-DL configuration may be signaled by a downlink control channel (e.g., PDCCH or EPDCCH), which may be used to determine the possible direction of a subframe 210, 220, 230 on the TDD carrier 200, 250 where the uplink subframe type may be determined from the reference TDD UL-DL configuration and the designated HARQ timing for each downlink subframe 210 and special subframe 220 of the TDD carriers 200, 250. This information may be indicated directly by a field in the Downlink Control Information (DCI). Such DCI field may relate to one or several higher layer configured reference TDD UL-DL configurations or bitmaps. For example, two such bits in the DCI would correspond to four states. Each such state could correspond to any of four higher layer configured TDD UL-DL configurations or bitmaps. An advantage of this type of dynamic signalling is that it can further avoid spatial bundling since a flexible subframe is only used as a downlink subframe on a need basis, which would reduce the fraction of time it has to have linked uplink subframe 310 on the uplink FDD carrier 300 for HARQ transmission, which in turn would require bundling, e.g., for HARQ-ACK feedback on the scheduling request resource.

One embodiment relates to uplink subframes which are defined for HARQ feedback of both the downlink FDD carrier 350 and the TDD carrier 200, 250. The method may then comprise spatial bundling within a component carrier, when spatial multiplexing is used on the carrier and transmitting the spatially bundled HARQ-ACK bits on the scheduling request resource. This reduces the HARQ message to two bits (one bit per serving cell) and thus any form of subframe- or component carrier bundling is avoided which is an advantage compared to the prior art LTE-Advanced system as HARQ information compression is reduced, leading to increased system efficiency.

Another embodiment relates to uplink subframes which are defined for HARQ feedback of only the downlink FDD carrier 350. In this case, it is realized that at most two HARQ-ACK bits may be needed to be fed back (assuming spatial multiplexing). However, in contrast to prior art systems, there is no need to perform spatial bundling in this case, since a QPSK symbol is capable of carrying two bits. The method may comprise transmitting the (non-bundled) HARQ-ACK bits on the scheduling request resource.

In other embodiments wherein subframes (210, 220, 230) on the TDD carrier 200, 250 are associated with HARQ feedback on an uplink subframe 310 of the uplink FDD carrier 300 in a many-to-one manner, the method may comprise transmitting the HARQ-ACK bits on the scheduling request resource bundled.

Furthermore, assuming the PUCCH is transmitted on the FDD carrier and that the there is a unique uplink subframe 310 on the uplink FDD carrier 300 for each downlink subframe 210 and special subframe 220 of the TDD carriers 200, 250 (e.g., it could be defined by that the HARQ timing of the TDD carrier follows the FDD carrier), Downlink Assignment Index (DAI) bits in the DCI may not be necessary for scheduling data on the TDD carrier 200, 250. This is realized due to that each subframe containing downlink transmission in the TDD carrier will correspond to one unique subframe in the uplink FDD carrier, in those embodiments. In one embodiment, DCI formats related to PDSCH transmission on the TDD carrier 200, 250 may not utilize any DAI bits. The presence of DAI may be predetermined or configured by the radio network node 110. Hence, it is possible to reduce the DCI size for the TDD carrier, which leads to less signalling overhead within the system and improved reliability of the control channel, i.e., larger coverage area over which the carrier aggregation may be performed.

In another example embodiment, the DAI bits are used for other purposes. For example, they may be set to predetermined values in order to act as additional error detection, i.e., virtual Cyclic Redundancy Check (CRC) bits. This would improve the reliability of receiving the PDCCH/EPDCCH. They may also be used for Transmission Power Control (TPC) commands. This may improve the PUCCH power control as TPC commands could be issued even from PDCCH/EPDCCH transmitted on SCells, in some embodiments.

Moreover, in FDD the HARQ round trip time is eight subframes, i.e., it takes eight subframes from a downlink transmission until a transmission/retransmission of the same HARQ process can take place. Therefore, eight HARQ processes are defined for FDD. For TDD, the maximum number of HARQ processes depends on the UL-DL configuration and varies between 4 and 15. This is due to that in TDD, for the HARQ timing, $k \geq 4$. It is an advantage if the HARQ round trip time delay could be minimized as this leads to shorter response times and less latency of the communication system. However, it may be realized that it is possible to use smaller values of k than what is used for TDD in LTE-Advanced. This may result in that the HARQ round trip time may be reduced, which would allow for using a smaller maximum number of HARQ processes. In that case, the number of bits in the HARQ process number in the DCI may be reduced. Similarly, the number of bits may remain but only some of the bits may be used, e.g., the most significant bit may be set to a predefined value.

According to some embodiments, carrier aggregation is made wherein the component carriers are deployed with different duplexing modes for a HARQ feedback method capable of conveying up to four HARQ-ACK bits.

Figure 5:
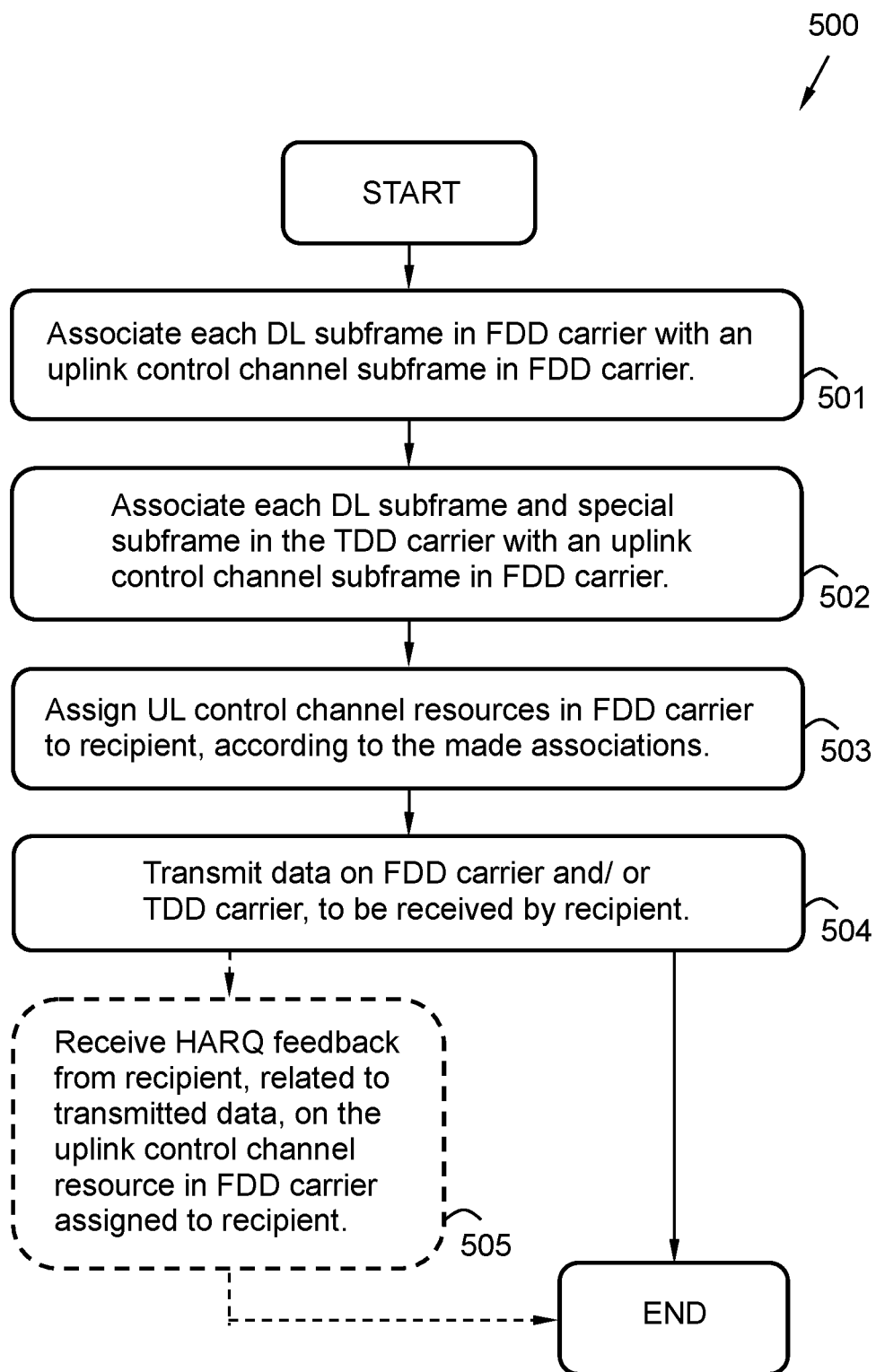
FIG. 5 is a flow chart illustrating a method in a radio network node according to an embodiment.

FIG. 5 is a flow chart illustrating embodiments of a method 500 in a radio network node 110 in a wireless communication system 100. The method 500 aims at providing data transmission and assignment of uplink control channel resources 310 in an uplink FDD carrier 300, for enabling a recipient 120 to provide HARQ feedback for data transmitted in the downlink using carrier aggregation of a downlink FDD carrier 350 and at least one TDD carrier 200.

The radio network node 110 may comprise an evolved NodeB (eNodeB). The wireless communication network 100 may be based on 3rd Generation Partnership Project Long Term Evolution (3GPP LTE). Further, the wireless communication system 100 may be based on FDD or TDD in different embodiments. The recipient 120 may comprise a User Equipment (UE). The downlink subframe 360 may comprise a Physical Downlink Shared Channel (PDSCH) in the downlink FDD carrier 350. The downlink subframe 210 may comprise a Physical Downlink Shared Channel (PDSCH) in the TDD carrier 200. The uplink control channel subframe 310 may comprise a Physical Uplink Control Channel (PUCCH) in the uplink FDD carrier 300.

The recipient 120 is enabled to provide HARQ feedback by selection of a sequence and a modulation symbol, or selection of a modulation symbol to form a HARQ message in the uplink subframe 310 of the uplink FDD carrier 300. The HARQ feedback for a downlink subframe 210, 360 n may be transmitted on the uplink control channel subframe 310 in the uplink FDD carrier 300 number n+ an offset value k. The offset value k may be set to 4, in some embodiments.

Further, the offset value k for providing HARQ feedback on the uplink subframe 310 on the uplink FDD carrier 300 may be determined from a higher layer configured entity or by a downlink control channel.

The carrier aggregation may comprise one downlink FDD carrier 350 and two TDD carriers 200, 250 in some embodiments, and wherein the total number of downlink subframes 210 and special subframes 220 of the two TDD carriers 200, 250 together does not exceed the total number of uplink subframes 310 in the uplink FDD carrier 300, per radio frame.

The type of uplink subframe 310 on the uplink FDD carrier 300 may be determined from a higher layer configured entity or by a downlink control channel.

The Downlink Control Information (DCI) in the downlink control channel associated with the TDD carrier 200 does not comprise any Downlink Assignment Index (DAI). The DCI in the downlink control channel of the TDD carrier 200 may comprise bits with predefined values. The DCI in the downlink control channel of the TDD carrier 200 may in some embodiments comprise bits dedicated for transmission power control.

To appropriately provide data transmission and assignment of uplink control channel, the method 500 may comprise a number of actions 501-505.

It is however to be noted that any, some or all of the described actions 501-505, may be performed in a somewhat different chronological order than the enumeration indicates, be performed simultaneously or even be performed in a completely reversed order according to different embodiments. Some actions may be performed within some alternative embodiments such as e.g. action 505. Further, it is to be noted that some actions may be performed in a plurality of alternative manners according to different embodiments, and that some such alternative manners may be performed only within some, but not necessarily all embodiments. The method 500 may comprise the following actions:

Action 501

Each downlink subframe 360 in the downlink FDD carrier 350 is associated with an uplink control channel subframe 310 in the uplink FDD carrier 300.

The association mapping from HARQ information to modulation symbol and/or sequence is independent of duplexing method of the carrier.

The association of each downlink subframe 360 in the downlink FDD carrier 350 with an uplink control channel subframe 310 in the uplink FDD carrier 300 in a one-to-one manner may generate at least one uplink subframe 310 in the uplink FDD carrier 300 comprising only HARQ feedback related to the downlink FDD carrier 350 in some embodiments.

The association mapping from HARQ information to modulation symbol and sequence for the FDD carriers 300, 350 and TDD carrier 200 may be based on the FDD and/or TDD HARQ-ACK procedures specified in 3GPP LTE-Advanced standard 3GPP TS 36.213, for FDD carriers 300, 350 and/or TDD carriers 200 in some embodiments.

Action 502

Each downlink subframe 210 and special subframe 220 in the TDD carrier 200 is associated with an uplink control channel subframe 310 in the uplink FDD carrier 300.

According to some embodiments, each downlink subframe 210 and special subframe 220 in the TDD carrier 200 may be associated with an uplink control channel subframe 310 in the uplink FDD carrier 300 in a one-to-one manner.

However, in some alternative embodiments, each downlink subframe 210 and special subframe 220 in the TDD carrier 200 may be associated with an uplink control channel subframe 310 in the uplink FDD carrier 300 in a many-to-one manner.

The association of each downlink subframe 210 and special subframe 220 in the TDD carrier 200 with an uplink control channel subframe 310 in the uplink FDD carrier 300 may generate at least one uplink subframe 310 in the uplink FDD carrier 300 comprising only HARQ feedback related to the downlink FDD carrier 350.

According to some embodiments, any subframe 210, 220, 230 in the TDD carrier 200 may be associated in a one-to-one manner, or alternatively a many-to-one manner with uplink control channel subframes 310 in the uplink FDD carrier 300, where said subframe 210, 220, 230 in the TDD carrier may be determined from a higher layer configured entity or by a downlink control channel.

Action 503

Uplink control channel resources 310 in the uplink FDD carrier 300 are assigned to the recipient 120, according to the made associations 501, 502.

HARQ information may be transmitted on a scheduling request resource in the uplink 310 of the uplink FDD carrier 300, and wherein spatial bundling is performed in uplink subframes 310 which are assigned 503 for HARQ feedback of both the downlink FDD carrier 350 and the TDD carrier 200; and spatial bundling is not performed in uplink subframes 310 which are assigned 503 for HARQ feedback of the downlink FDD carrier 350.

HARQ feedback on the uplink subframe 310 on the uplink FDD carrier 300 may not relate to any spatial subframe bundling for the TDD carrier 200 in some embodiments.

Action 504

Data is transmitted on said downlink FDD carrier 350 and/or TDD carrier 200, to be received by the recipient 120.

Action 505

This action may be performed within some, but not all embodiments.

HARQ feedback may be received from the recipient 120, related to the transmitted 504 data, on the uplink control channel resource 340 in the uplink FDD carrier 300 assigned 503 to the recipient 120.

Figure 6:
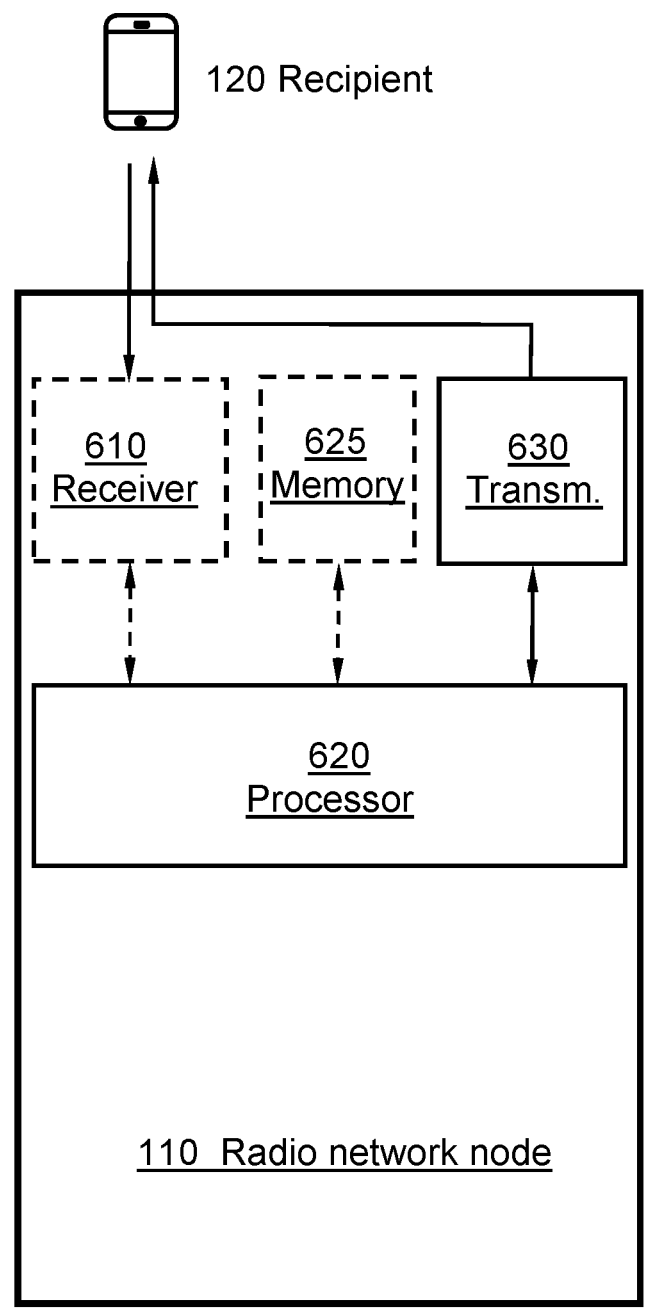
FIG. 6 is a block diagram illustrating a radio network node according to an embodiment.

FIG. 6 illustrates an embodiment of a radio network node 110 comprised in a wireless communication system 100. The radio network node 110 is configured for performing at least some of the previously described method actions 501-505, for providing data transmission and assignment of uplink control channel resources 310 in an uplink FDD carrier 300, for enabling a recipient 120 to provide HARQ feedback for data transmitted in the downlink using carrier aggregation of a downlink FDD carrier 350 and at least one TDD carrier 200.

The radio network node 110 may comprise an evolved NodeB (eNodeB). The wireless communication network 100 may be based on 3rd Generation Partnership Project Long Term Evolution (3GPP LTE). Further, the wireless communication system 100 may be based on FDD or TDD in different embodiments. The recipient 120 may comprise a User Equipment (UE). The downlink subframe 360 may comprise a Physical Downlink Shared Channel (PDSCH) in the downlink FDD carrier 350. The downlink subframe 210 may comprise a Physical Downlink Shared Channel (PDSCH) in the TDD carrier 200. The uplink control channel subframe 310 may comprise a Physical Uplink Control Channel (PUCCH) in the uplink FDD carrier 300.

The radio network node 110 comprises a processor 620, configured for associating each downlink subframe 360 in the downlink FDD carrier 350 with an uplink control channel subframe 310 in the uplink FDD carrier 300; and also configured for associating each downlink subframe 210 and special subframe 220 in the TDD carrier 200 with an uplink control channel subframe 310 in the uplink FDD carrier 300; and furthermore configured for assigning uplink control channel resources 310 in the uplink FDD carrier 300 to the recipient 120, according to the made associations.

The processor 620 may in some embodiments be configured for associating each downlink subframe 210 and special subframe 220 in the TDD carrier 200 with an uplink control channel subframe 310 in the uplink FDD carrier 300 in a one-to-one manner.

In some alternative embodiments, the processor 620 may be configured for associating each downlink subframe 210 and special subframe 220 in the TDD carrier 200 with an uplink control channel subframe 310 in the uplink FDD carrier 300 in a many-to-one manner.

Such processor 620 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilized expression "processor" may thus represent a processing circuitry comprising a plurality of processing circuits, such as, e.g., any, some or all of the ones enumerated above.

However, in some embodiments, the radio network node 110 and/or the processor 620 may comprise an association unit, configured for associating each downlink subframe 360 in the downlink FDD carrier 350 with an uplink control channel subframe 310 in the uplink FDD carrier 300. Also, the association unit may be configured for associating each downlink subframe 210 and special subframe 220 in the TDD carrier 200 with an uplink control channel subframe 310 in the uplink FDD carrier 300. In addition, in some embodiments, the radio network node 110 and/or the processor 620 may comprise an assignment unit, configured for assigning uplink control channel resources 310 in the uplink FDD carrier 300 to the recipient 120, according to the made associations 501, 502.

Further, the radio network node 110 comprises a transmitter 630, configured for transmitting data on the downlink FDD carrier 350 and/or TDD carrier 200, to be received by the recipient 120. The transmitter 630 may be configured for transmitting wireless signals to the recipient/user equipment 120.

Also, the radio network node 110 may comprise a receiver 610, configured for receiving HARQ feedback from the recipient 120, related to the transmitted data, on the uplink control channel resource 310 in the uplink FDD carrier 300 assigned to the recipient 120.

Such receiver 610 in the radio network node 110 may be configured for receiving wireless signals from the recipient/user equipment 120 or any other entity configured for wireless communication over a wireless interface according to some embodiments.

In addition according to some embodiments, the radio network node 110 may in some embodiments also comprise at least one memory 625 in the radio network node 110. The optional memory 625 may comprise a physical device utilized to store data or programs, i.e., sequences of instructions, on a temporary or permanent basis. According to some embodiments, the memory 625 may comprise integrated circuits comprising silicon-based transistors. Further, the memory 625 may be volatile or non-volatile.

The actions 501-505 to be performed in the radio network node 110 may be implemented through the one or more processors 620 in the radio network node 110 together with computer program product for performing the functions of the actions 501-505.

Thus a computer program comprising program code for performing the method 500 according to any of actions 501-505, for data transmission and assignment of uplink control channel resources 310 in an uplink FDD carrier 300, for enabling a recipient 120 to provide HARQ feedback for data transmitted in the downlink using carrier aggregation of a downlink FDD carrier 350 and at least one TDD carrier 200, when the computer program is loaded into the processor 620 in the radio network node 110.

The computer program product mentioned above may be provided for instance in the form of a data carrier carrying computer program code for performing at least some of the actions 501-505 according to some embodiments when being loaded into the processor 620. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the radio network node 110, e.g., over an Internet or an intranet connection.

Figure 7:
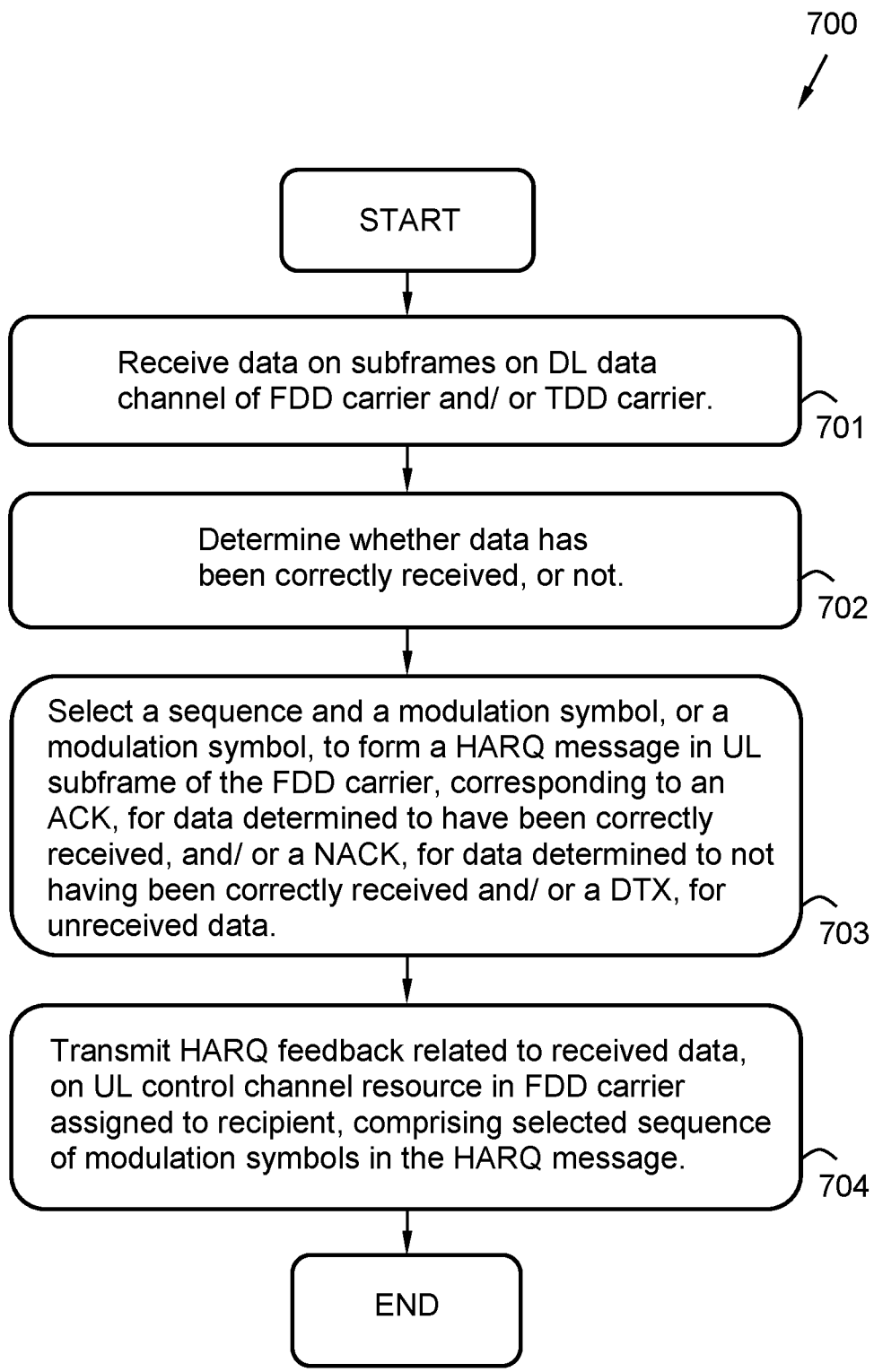
FIG. 7 is a flow chart illustrating a method in a recipient according to an embodiment.

FIG. 7 is a flow chart illustrating embodiments of a method 700 in a recipient 120 in a wireless communication system 100. The method 700 aims at providing HARQ feedback for data received in the downlink using carrier aggregation of a downlink Frequency-Division Duplexing (FDD) carrier 350 and at least one Time-Division Duplexing (TDD) carrier 200, in an uplink control channel resource 310 in an uplink FDD carrier 300.

The recipient 120 may comprise a User Equipment (UE). The radio network node 110 may comprise an evolved NodeB (eNodeB). The wireless communication network 100 may be based on 3rd Generation Partnership Project Long Term Evolution (3GPP LTE). Further, the wireless communication system 100 may be based on FDD or TDD in different embodiments. The downlink subframe 360 may comprise a Physical Downlink Shared Channel (PDSCH) in the downlink FDD carrier 350. The downlink subframe 210 may comprise a Physical Downlink Shared Channel (PDSCH) in the TDD carrier 200. The uplink control channel subframe 310 may comprise a Physical Uplink Control Channel (PUCCH) in the uplink FDD carrier 300.

The carrier aggregation may comprise one downlink FDD carrier 350 and two TDD carriers 200, 250, and wherein the total number of downlink subframes 210 and special subframes 220 does not exceed the total number of uplink subframes 310 in the uplink FDD carrier 300, per radio frame.

To appropriately provide HARQ feedback, the method 700 may comprise a number of actions 701-704.

It is however to be noted that any, some or all of the described actions 701-704, may be performed in a somewhat different chronological order than the enumeration indicates, be performed simultaneously or even be performed in a completely reversed order according to different embodiments. Further, it is to be noted that some actions may be performed in a plurality of alternative manners according to different embodiments, and that some such alternative manners may be performed only within some, but not necessarily all embodiments. The method 700 may comprise the following actions.

Action 701

Data is received on subframes 360 on a downlink data channel of a downlink FDD carrier 350 and/or a downlink subframe 210 on a downlink data channel of TDD carrier 200.

Action 702

It is determined whether the data has been received 701 correctly, or not.

Action 703

A sequence and a modulation symbol, or a modulation symbol, is selected to form a HARQ message in the uplink subframe 310 of the uplink FDD carrier 300, corresponding to an acknowledgement (ACK) for data determined 702 to have been correctly received 701, a non-acknowledgement (NACK) for data determined 702 to not having been correctly received 701 and/or a Discontinuous Transmission (DTX) for data not having been received 701.

The association mapping from HARQ information to sequence and modulation symbol may be independent of duplexing method of the carrier.

The association mapping from HARQ information to modulation symbol and sequence for the FDD carriers 300, 350 and TDD carrier 200 may be based on the FDD and/or TDD HARQ-ACK procedures specified in 3GPP LTE-Advanced standard 3GPP TS 36.213, for FDD carriers 300, 350 and/or TDD carriers 200.

Action 704

HARQ feedback related to the received 701 data is transmitted on the uplink control channel resource 310 in the uplink FDD carrier 300 assigned to the recipient 120, comprising the selected 703 sequence and modulation symbol, or the selected 703 modulation symbol in the HARQ message.

The HARQ feedback may be provided by selection of a sequence and a modulation symbol, or selection of a modulation symbol to form a HARQ message in the uplink subframe 310 of the uplink FDD carrier 300.

The HARQ feedback may be transmitted on a scheduling request resource in the uplink 310 of the uplink FDD carrier 300 in some embodiments. Spatial bundling may be performed in uplink subframes which are assigned for HARQ feedback of both the downlink FDD carrier 350 and the TDD carrier 200; spatial bundling may not be performed in uplink subframes 310 which are assigned for HARQ feedback of the downlink FDD carrier 350.

The type of uplink subframe 310 on the uplink FDD carrier 300 may be determined from a higher layer configured entity or by a downlink control channel in some embodiments.

Figure 8:
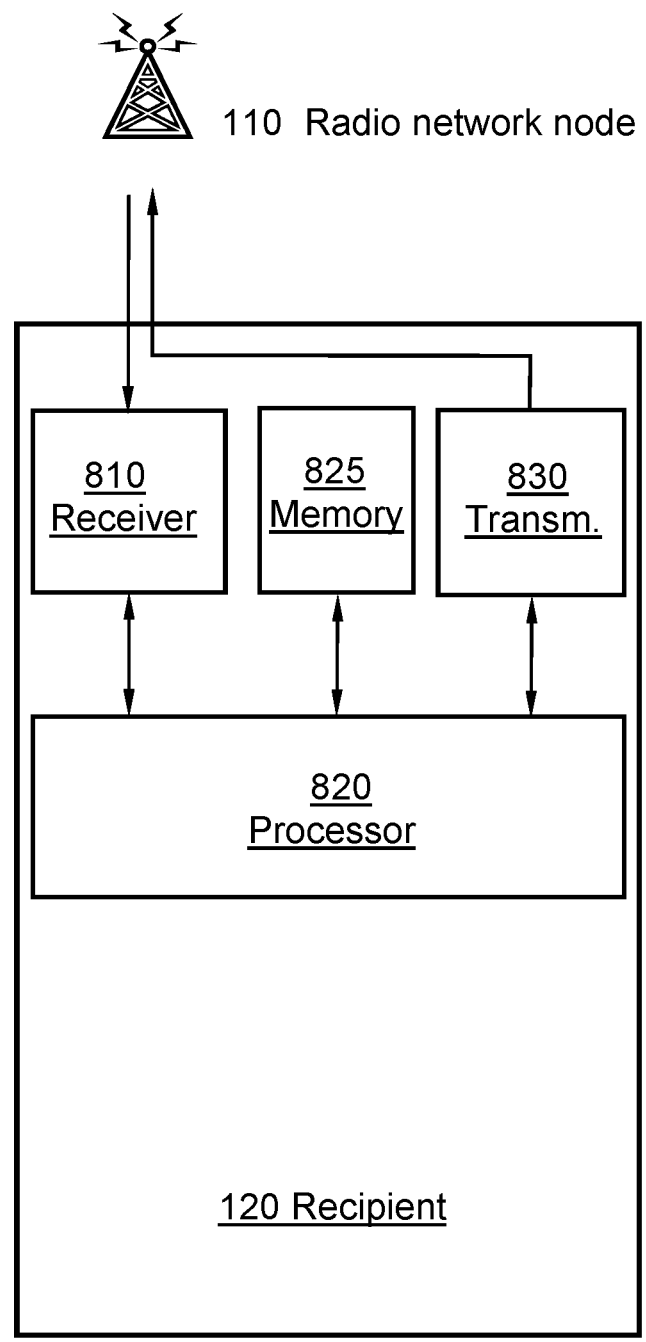
FIG. 8 is a block diagram illustrating a recipient according to an embodiment.

FIG. 8 illustrates an embodiment of recipient 120 comprised in a wireless communication system 100. The recipient 120 is configured for performing at least some of the previously described method actions 701-704, for providing HARQ feedback for data received in the downlink using carrier aggregation of a downlink Frequency-Division Duplexing (FDD) carrier 350 and at least one Time-Division Duplexing (TDD) carrier 200, in an uplink control channel resource 310 in an uplink FDD carrier 300.

The recipient 120 may comprise a User Equipment (UE). The radio network node 110 may comprise an evolved NodeB (eNodeB). The wireless communication network 100 may be based on 3rd Generation Partnership Project Long Term Evolution (3GPP LTE). Further, the wireless communication system 100 may be based on FDD or TDD in different embodiments. The downlink subframe 360 may comprise a Physical Downlink Shared Channel (PDSCH) in the downlink FDD carrier 350. The downlink subframe 210 may comprise a Physical Downlink Shared Channel (PDSCH) in the TDD carrier 200. The uplink control channel subframe 310 may comprise a Physical Uplink Control Channel (PUCCH) in the uplink FDD carrier 300.

The recipient 120 comprises a receiver 810, configured for receiving data on downlink subframes 360 on a downlink data channel of a FDD carrier 350 and/or on downlink subframes 210 on a downlink data channel of a TDD carrier 200.

The recipient 120 also comprises a processor 820, configured for determining whether the data has been correctly received, or not, and also configured for selecting a sequence or a modulation symbol to form a HARQ message in the uplink subframe 310 of the uplink FDD carrier 300, corresponding to an acknowledgement (ACK) for data determined to have been correctly received, a non-acknowledgement (NACK) for data determined to not having been correctly received and/or a Discontinuous Transmission (DTX) for data not having been received.

Such processor 820 may comprise one or more instances of a processing circuit, i.e., a Central Processing Unit (CPU), a processing unit, a processing circuit, a processor, an Application Specific Integrated Circuit (ASIC), a microprocessor, or other processing logic that may interpret and execute instructions. The herein utilized expression "processor" may thus represent a processing circuitry comprising a plurality of processing circuits, such as, e.g., any, some or all of the ones enumerated above.

In some alternative embodiments, the recipient 120 and/or the processor 820 may comprise a determining unit, configured for determining whether the data has been correctly received, in some embodiments. Further, the recipient 120 and/or the processor 820 may also comprise a selecting unit, configured for selecting a sequence and a modulation symbol, or selecting a modulation symbol, to form a HARQ message in the uplink subframe 310 of the uplink FDD carrier 300, corresponding to an acknowledgement (ACK) for data determined to have been correctly received, a non-acknowledgement (NACK) for data determined to not having been correctly received and/or a Discontinuous Transmission (DTX) for data not having been received.

Furthermore, the recipient 120 also comprises a transmitter 830, configured for transmitting HARQ feedback related to the received data, on the uplink control channel resource 310 in the uplink FDD carrier 300 assigned to the recipient 120, comprising the selected sequence and modulation symbol, or the selected modulation symbol in the HARQ message.

In addition, the recipient 120 in some embodiments also may comprise at least one memory 825 in the recipient 120. The optional memory 825 may comprise a physical device utilized to store data or programs, i.e., sequences of instructions, on a temporary or permanent basis. According to some embodiments, the memory 825 may comprise integrated circuits comprising silicon-based transistors. Further, the memory 825 may be volatile or non-volatile.

The actions 701-704 to be performed in the recipient 120 may be implemented through the one or more processors 820 in the recipient 120 together with computer program product for performing the functions of the actions 701-704.

Thus a computer program comprising program code for performing the method 700 according to any of actions 701-704, for providing HARQ feedback for data transmitted in the downlink using carrier aggregation of a downlink FDD carrier 350 and at least one TDD carrier 200, when the computer program is loaded into the processor 820 in the recipient 120.

The computer program product mentioned above may be provided for instance in the form of a data carrier carrying computer program code for performing at least some of the actions 701-704 according to some embodiments when being loaded into the processor 820. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the recipient 120, e.g., over an Internet or an intranet connection.

The terminology used in the description of the embodiments as illustrated in the accompanying drawings is not intended to be limiting of the described methods 500, 700; radio network node 110 and/or recipient 120. Various changes, substitutions and/or alterations may be made, without departing from the invention as defined by the appended claims.

As used herein, the term "and/or" comprises any and all combinations of one or more of the associated listed items. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for providing hybrid automatic repeat request (HARQ) feedback for data received in downlink transmission, wherein a carrier aggregation of a downlink Frequency-Division Duplexing (FDD) carrier and a Time-Division Duplexing (TDD) carrier is applied in the downlink transmission, comprising:

receiving, by a terminal device, first data carried in a subframe n in the downlink FDD carrier, wherein a first uplink control channel subframe in an uplink FDD carrier is associated with the subframe n in the downlink FDD carrier, and a subframe n in the TDD carrier is an uplink subframe;

selecting, by the terminal device, a sequence and a modulation symbol, or selecting, by the terminal device, a modulation symbol, to form a first HARQ feedback indicating whether the first data has been correctly received; and transmitting, by the terminal device, the first HARQ feedback on a scheduling request resource of the first uplink control channel subframe in the uplink FDD carrier, wherein spatial bundling is not performed in the first uplink control channel subframe.

2. The method according to claim 1, wherein the first HARQ feedback indicates whether the first data has been correctly received by:

an acknowledgement (ACK) indicating that the first data has been correctly received; or a non-acknowledgement (NACK) indicating that the first data has not been correctly received.

3. The method according to claim 1, wherein each of subframes for transmitting data in the downlink FDD carrier is associated with one of a plurality of uplink control channel subframes in the uplink FDD carrier; and each of downlink subframes for transmitting data and each of special subframes in the TDD carrier is associated with one of the plurality of uplink control channel subframes in the uplink FDD carrier.

4. The method according to claim 1, further comprising:

receiving, by the terminal device, second data carried in a subframe m in the downlink FDD carrier and a downlink subframe m in the TDD carrier, wherein the subframe m in the downlink FDD carrier and the downlink subframe m in the TDD carrier are associated with a second uplink control channel subframe in the uplink FDD carrier;

selecting, by the terminal device, a sequence and a modulation symbol, or selecting, by the terminal device, a modulation symbol, to form a second HARQ feedback indicating whether the second data has been correctly received; and transmitting, by the terminal device, the second HARQ feedback on a scheduling request resource of the second uplink control channel subframe in the uplink FDD carrier, wherein spatial bundling is performed in the second uplink control channel subframe.

5. A device for providing hybrid automatic repeat request (HARQ) feedback for data received in downlink transmission, wherein a carrier aggregation of a downlink Frequency-Division Duplexing (FDD) carrier and a Time-Division Duplexing (TDD) carrier is applied in the downlink transmission, comprising:
a memory storing program instructions and a processor coupled to the memory, wherein when executed by the processor, the instructions cause the device to:
receive first data carried in a subframe n in the downlink FDD carrier, wherein a first uplink control channel subframe in an uplink FDD carrier is associated with the subframe n in the downlink FDD carrier, and a subframe n in the TDD carrier is an uplink subframe;
select a sequence and a modulation symbol, or select a modulation symbol, to form a first HARQ feedback indicating whether the first data has been correctly received; and
transmit the first HARQ feedback on a scheduling request resource of the first uplink control channel subframe in the uplink FDD carrier,
wherein spatial bundling is not performed in the first uplink control channel subframe.

6. The device according to claim 5, wherein the first HARQ feedback indicates whether the first data has been correctly received by:
an acknowledgement (ACK) indicating that the first data has been correctly received; or
a non-acknowledgement (NACK) indicating that the first data has not been correctly received.

7. The device according to claim 5, wherein each of subframes for transmitting data in the downlink FDD carrier is associated with one of a plurality of uplink control channel subframes in the uplink FDD carrier; and
each of downlink subframes for transmitting data and each of special subframes in the TDD carrier is associated with one of the plurality of uplink control channel subframes in the uplink FDD carrier.

8. The device according to claim 5, wherein when executed by the processor, the instructions further cause the device to:
receive second data carried in a subframe m in the downlink FDD carrier and a downlink subframe m in the TDD carrier, wherein the subframe m in the downlink FDD carrier and the downlink subframe m in the TDD carrier are associated with a second uplink control channel subframe in the uplink FDD carrier;
select a sequence and a modulation symbol, or select a modulation symbol, to form a second HARQ feedback indicating whether the second data has been correctly received; and
transmit the second HARQ feedback on a scheduling request resource of the second uplink control channel subframe in the uplink FDD carrier, wherein spatial bundling is performed in the second uplink control channel subframe.

9. A method for receiving hybrid automatic repeat request (HARQ) feedback for data transmitted in downlink transmission, wherein a carrier aggregation of a downlink Frequency-Division Duplexing (FDD) carrier and a Time-Division Duplexing (TDD) carrier is applied in the downlink transmission, comprising:

transmitting, by a radio network node to a recipient device, first data in a subframe n in the downlink FDD carrier, wherein a first uplink control channel subframe in an uplink FDD carrier is associated with the subframe n in the downlink FDD carrier, and a subframe n in the TDD carrier is an uplink subframe; and
receiving, by the radio network node from the recipient device, a first HARQ feedback for the first data, wherein the first HARQ feedback is carried on a scheduling request resource of the first uplink control channel subframe in the uplink FDD carrier,
wherein spatial bundling is not performed in the first uplink control channel subframe.

10. The method according to claim 9, further comprising:
transmitting, by the radio network node to the recipient device, second data in a subframe m in the downlink FDD carrier and a downlink subframe m in the TDD carrier, wherein the subframe m in the downlink FDD carrier and the downlink subframe m in the TDD carrier are associated with a second uplink control channel subframe in the uplink FDD carrier; and
receiving, by the radio network node from the recipient device, a second HARQ feedback for the second data, wherein the second HARQ feedback is carried on a scheduling request resource of the second uplink control channel subframe in the uplink FDD carrier, and wherein spatial bundling is performed in the second uplink control channel subframe.

11. The method according to claim 9, wherein
each of subframes for transmitting data in the downlink FDD carrier is associated with one of a plurality of uplink control channel subframes in the uplink FDD carrier; and
each of downlink subframes for transmitting data and each of special subframes in the TDD carrier is associated with one of the plurality of uplink control channel subframes in the uplink FDD carrier.

12. The method according to claim 9, further comprising:
associating, by the radio network node, each downlink subframe for transmitting data in the downlink FDD carrier with one of a plurality of uplink control channel subframes in the uplink FDD carrier; and
associating, by the radio network node, each downlink subframe for transmitting data and each special subframe in the TDD carrier with one of the plurality of uplink control channel subframes in the uplink FDD carrier.

13. A radio network node for receiving hybrid automatic repeat request (HARQ) feedback for data transmitted in downlink transmission, wherein a carrier aggregation of a downlink Frequency-Division Duplexing (FDD) carrier and a Time-Division Duplexing (TDD) carrier is applied in the downlink transmission, comprising:
a memory storing program instructions and a processor coupled to the memory, wherein when executed by the processor, the instructions cause the radio network node to:
transmit, to the recipient device, first data in a subframe n in the downlink FDD carrier, wherein a first uplink control channel subframe in an uplink FDD carrier is associated with the subframe n in the downlink FDD carrier, and a subframe n in the TDD carrier is an uplink subframe; and receive, from the recipient device, a first HARQ feedback for the first data, wherein the first HARQ feedback is carried on a scheduling request resource of the first uplink control channel subframe in the uplink FDD carrier, and spatial bundling is not performed in the first uplink control channel subframe.

14. The radio network node according to claim 13, wherein when executed by the processor, the instructions further cause the radio network node to:

transmit, to the recipient device, second data in a subframe m in the downlink FDD carrier and a downlink subframe m in the TDD carrier, wherein the subframe m in the downlink FDD carrier the downlink subframe m in the TDD carrier are associated with a second uplink control channel subframe in the uplink FDD carrier; and receive, from the recipient device, a second HARQ feedback for the second data, wherein the second HARQ feedback is carried on a scheduling request resource of the second uplink control channel subframe in the uplink FDD carrier, and spatial bundling is performed in the second uplink control channel subframe.

15. The radio network node according to claim 13, wherein each of subframes for transmitting data in the downlink FDD carrier is associated with one of a plurality of uplink control channel subframes in the uplink FDD carrier; and each of downlink subframes for transmitting data and each of special subframes in the TDD carrier is associated with one of the plurality of uplink control channel subframes in the uplink FDD carrier.

16. The radio network node according to claim 13, wherein, when executed by the processor, the instructions further cause the radio network node to:

associate each downlink subframe for transmitting data in the downlink FDD carrier with one of a plurality of uplink control channel subframes in the uplink FDD carrier; and associate each downlink subframe for transmitting data and each special subframe in the TDD carrier with one of the plurality of uplink control channel subframes in the uplink FDD carrier.

\* \* \* \* \*

UNITED STATES PATENT AND TRADEMARK OFFICE
CERTIFICATE OF CORRECTION

PATENT NO. : 11,082,981 B2
APPLICATION NO. : 16/821988
DATED : August 3, 2021
INVENTOR(S) : Berggren et al.

It is certified that error appears in the above-identified patent and that said Letters Patent is hereby corrected as shown below:

On the Title Page

Applicant (71): "HUAWEI TECHNOLOGIES CO., LTD., Guangdong (CN)" should read
-- HUAWEI TECHNOLOGIES CO., LTD., Shenzhen (CN) --.

Page 2, Other Publications (56), Line 5: "3GPP TS 36321 V 11.3.0, 3rd Generation Partnership Project; Tech-" should read -- 3GPP TS 36.321 V 11.3.0, 3rd Generation Partnership Project; Tech- --.

Page 2, Other Publications (56), Line 20: "LTE TDD", 3GPP TSG-RAN WG1#54, R1-083256, 4ugust 2008." should read -- LTE TDD", 3GPP TSG-RAN WG1#54, R1-083256, August 2008. --.

Page 2, Other Publications (56), Line 28: "TSG-RAN WG1 74, R1-133184, Aug. 2013. total 3 pages." should read -- TSG-RAN WG1 74, R1-133184, Aug. 2013. total 8 pages. --.

Signed and Sealed this
Nineteenth Day of July, 2022

Katherine Kelly Vidal
*Director of the United States Patent and Trademark Office*